United States Patent
Self et al.

(10) Patent No.: US 12,518,718 B2
(45) Date of Patent: Jan. 6, 2026

(54) SYSTEMS AND METHODS FOR PROVIDING INTEGRATED DIGITAL SIGNAGE ADVERTISING TO ELECTRONIC SHELF EDGE LABELS AND SYSTEMS THEREOF

(71) Applicant: ComQi, New York, NY (US)

(72) Inventors: Kevin Guy Self, Oakville (CA); Gary Paul Madgwick, Lightwater (GB)

(73) Assignee: ComQi, New York, NY (US)

( * ) Notice: Subject to any disclaimer, the term of this patent is extended or adjusted under 35 U.S.C. 154(b) by 415 days.

(21) Appl. No.: 18/329,709

(22) Filed: Jun. 6, 2023

(65) Prior Publication Data

US 2023/0402020 A1 Dec. 14, 2023

Related U.S. Application Data

(60) Provisional application No. 63/351,075, filed on Jun. 10, 2022.

(51) Int. Cl.
*G09G 5/00* (2006.01)
*G06F 9/455* (2018.01)
(Continued)

(52) U.S. Cl.
CPC ........... *G09G 5/00* (2013.01); *G06F 9/45558* (2013.01); *G06F 9/5016* (2013.01);
(Continued)

(58) Field of Classification Search
None
See application file for complete search history.

(56) References Cited

U.S. PATENT DOCUMENTS

2005/0039206 A1 2/2005 Opdycke
2006/0015414 A1 1/2006 Congram et al.
(Continued)

OTHER PUBLICATIONS

International Search Report and Written Opinion issued in International Application No. PCT/US2023/067955, mailed on Oct. 5, 2023, 11 pages.
(Continued)

*Primary Examiner* — Craig C Dorais
(74) *Attorney, Agent, or Firm* — Dorsey & Whitney LLP

(57) ABSTRACT

Methods and systems for deploying and running containerized applications over a digital signage network involve: deploying packaged containerized applications to a remotely located digital signage player, and using a containerized application management and communications interface of the player to install and initialize the packaged containerized applications into running containerized applications, each running containerized application for monitoring communicatively coupled external computer systems and to generate monitoring information. One of the external computer systems includes an electronic shelf edge label system with an electronic shelf edge device, and the running containerized applications transmit instructions to the electronic shelf edge device to generate a human perceptible signal as the digital signage player causes promotional content to be played on an electronic display of the digital signage player in an area proximate thereto, and the containerized application is configured to monitor the electronic shelf edge device and communicate monitored information over the network.

20 Claims, 22 Drawing Sheets

(51) Int. Cl.
    *G06F 9/50*     (2006.01)
    *G06F 11/30*     (2006.01)
    *G06Q 10/0834*     (2023.01)
    *G06Q 10/087*     (2023.01)
    *G09F 9/30*     (2006.01)

(52) U.S. Cl.
    CPC ........ *G06F 9/5027* (2013.01); *G06F 11/3055* (2013.01); *G06Q 10/08345* (2013.01); *G06Q 10/087* (2013.01); *G09F 9/30* (2013.01); *G06F 2009/45591* (2013.01); *G09G 2370/022* (2013.01)

(56) References Cited

U.S. PATENT DOCUMENTS

| | | | |
|---|---|---|---|
| 2019/0250946 A1* | 8/2019 | Parameshwaran | G06F 9/5088 |
| 2021/0369071 A1 | 12/2021 | Bronicki | |
| 2022/0129526 A1 | 4/2022 | Bliss | |
| 2022/0164186 A1* | 5/2022 | Pamidala | G06F 9/5088 |
| 2023/0144662 A1* | 5/2023 | Tasinga | G06F 9/5088 718/105 |

OTHER PUBLICATIONS

Advantech Co., Ltd., Product listings for Digital Signage System, 2 pages, retrieved on Nov. 2, 2022, retrieved from https://www.advantech.com/zh-tw/products/digital-signage-players/sub_1-2jkfh2.

CDW® , "Digital Signage Solutions and Displays", product listing, retrieved on Nov. 2, 2022, retrieved from https://www.cdw.com/content/cdw/en/solutions/digital-signage-solutions.html.

INTEL® , "Intel® NUC as a Digital Signage Player", product listing, retrieved on Nov. 2, 2022, retrieved from https://www.intel.com.tw/content/www/tw/zh/products/docs/boards-kits/nuc/nuc-digital-signage.html.

Lee, Wonjae , et al., "Digital Sinage System Using Virtualization Technoloby", The 18th IEEE International Symposium on Consumer Electronics, 2 pages, Jun. 22-25, 2014.

* cited by examiner

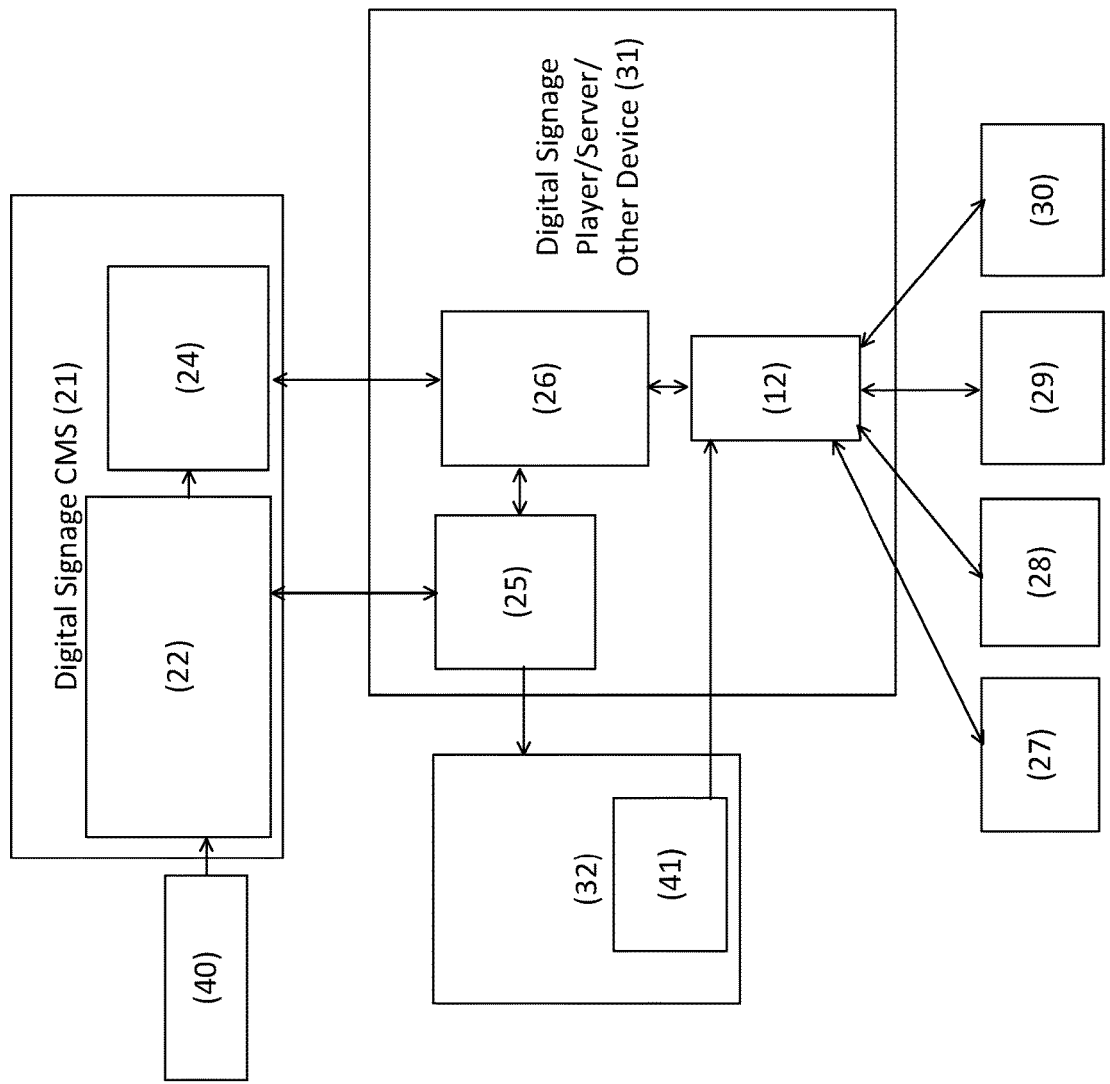

SALE  SALE  SALE  SALE  SALE

Fig. 4C

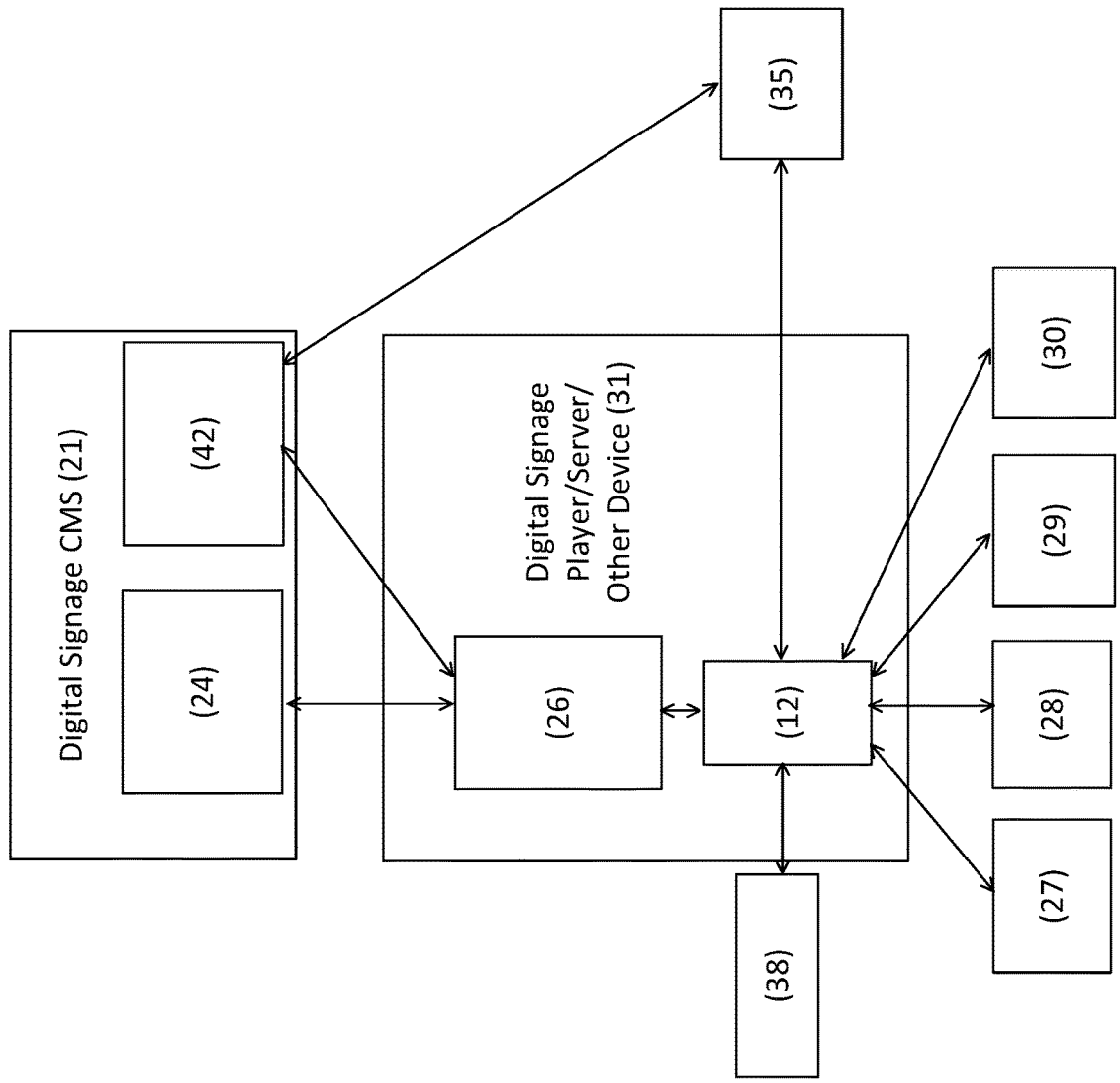

1200

SYSTEMS AND METHODS FOR PROVIDING INTEGRATED DIGITAL SIGNAGE ADVERTISING TO ELECTRONIC SHELF EDGE LABELS AND SYSTEMS THEREOF

CROSS-REFERENCE TO RELATED APPLICATIONS

This application claims priority to U.S. Provisional Patent Application No. 63/351,075, filed Jun. 10, 2022, entitled "SYSTEMS AND METHODS FOR PROVIDING INTEGRATED DIGITAL SIGNAGE ADVERTISING TO ELECTRONIC SHELF EDGE LABELS AND SYSTEMS THEREOF", which is incorporated by reference herein, in its entirety and for all purposes.

TECHNICAL FIELD

Provided are systems and methods for managing electronic shelf edge labels (ESLs) and their associated systems via distributed networks, such as a network for digital signage advertising.

BACKGROUND

Typically, digital signage systems are separated from electronic shelf edge devices and their associated systems. This requires that clients use separate applications to manage the different systems.

SUMMARY

Prior approaches lack solutions for linking electronic shelf edge label content and features to the digital signage content beyond sending similar content to both systems. Implementations herein bridge this gap and by providing an application deployment method to manage the various application integrations enabling electronic shelf edge labels (ESLs) to be controlled and monitored by a distributed network for digital signage advertising.

According to certain implementations, a method of deploying and running containerized applications over a digital signage network involves deploying from a digital signage content management system executed on the digital signage network, a plurality of packaged containerized applications to a digital signage player remotely located from and communicatively coupled to the digital signage content management system, the digital signage player having a processor and memory; and using a containerized application management and communications interface of the digital signage player to install and initialize the plurality of packaged containerized applications into a plurality of running containerized applications, each running containerized application configured to monitor one or more external computer systems communicatively coupled to the running containerized application and to generate monitoring information, where one of the one or more external computer systems includes an electronic shelf edge label system, the electronic shelf edge label system including at least one electronic shelf edge device, and where the one of the plurality of running containerized applications is configured to transmit instructions to the electronic shelf edge device to generate a human perceptible signal as the digital signage player causes promotional content to be played on an electronic display of the digital signage player in an area proximate the electronic shelf edge device, where the played promotional content relates to a product associated with the electronic shelf edge device, and where the containerized application is configured to monitor the electronic shelf edge device and transmit generated monitoring information for use by the digital signage content management system.

Implementations and alternatives may involve the running containerized application transmitting the generated monitoring information to other running containerized applications; may involve the running containerized application being executed from a virtualized environment of the digital signage player in which the virtualized environment is configured to limit computer resources of the digital signage player that can be used by the running containerized application, and in which the computer resources includes one or more of CPU resources, memory resources or storage space of the digital signage player, and the containerized application management and communications interface may be configured to collect status and running statistics information of the virtualized environment and to transmit the collected status and running statistics information to the digital signage CMS.

Implementations and alternatives may involve the containerized application management and communications interface being configured to receive the generated monitoring information from the containerized application and transmit the received information to one or more of the digital signage media playback engines or the digital signage content management system.

Implementations and alternatives may involve the running containerized application being further configured to monitor and generate monitoring information for the digital signage player.

Implementations and alternatives may involve the running containerized application being configured to transmit video and/or audio output to the electronic shelf edge label system. In such implementations and alternatives, the video and/or audio output may be streaming media, and the running containerized application may be configured to transmit the streaming media to an electronic display of the electronic shelf edge label system.

Implementations and alternatives may involve the running containerized application being communicatively coupled to one or more computer systems including a pricing system, inventory system, inventory management system, customer ordering system or wayfinding application, and may be configured to monitor the one or more computer systems and transmit generated monitoring information for use by the digital signage content management system.

Implementations and alternatives may involve the running containerized application being communicatively coupled to an inventory system, and where the running containerized application receives product inventory level information from the inventory system and transmits the information for use by a conditional playback engine of the digital signage content management system to determine whether to cease the digital signage player from causing the promotional content to be played on the electronic display, where when the promotional content should be ceased from playing, the digital signage content management system transmits instructions to the digital signage player to cease playing the promotional content on the electronic display.

Implementations and alternatives may involve the human perceptible signal being one or more of a flashing light, a playing sound, a vibration, a playing audio and/or video, or streaming content.

Implementations and alternatives may involve the running containerized application retrieving dynamic content from the one or more external computer systems and transmitting the retrieved content for display on the electronic display of the digital signage player.

According to further implementations, a network-based digital signage system includes: a digital signage player communicatively coupled to an electronic display, the digital signage player configured to transmit media content to the electronic display for playing the media content thereon; and a plurality of electronic shelf edge devices communicatively coupled to the digital signage player via running containerized applications, the containerized applications executed on the digital signage player and configured to monitor the plurality of electronic shelf edge devices, where the running containerized applications transmit monitoring data over a network for use by a digital signage content management server located remotely from the digital signage player.

Implementations and alternatives may involve the electronic shelf edge devices including a human perceptible signal generator configured to generate one or more of a flashing light, a playing sound, a vibration, a playing audio and/or video, or streaming content.

Implementations and alternatives may involve the digital signage player including a Docker container, where the Docker container is configured to enable the running containerized applications to be implemented on the digital signage player.

Implementations and alternatives may involve the containerized application being configured to receive event messages and data from one of the plurality of electronic shelf edge devices, and the Docker container includes an interface configured to transmit the received messages and data to the remotely located digital signage content management server via a containerized application management and communications interface of the digital signage player.

Implementations and alternatives may involve the system including a conditional playback engine configured to receive inventory data for a product from a plurality of the running containerized applications, each configured to retrieve the inventory data from an electronic inventory system, where if the conditional playback engine determines the inventory data is at or above a pre-determined level, media content associated with the product is caused to be played on a display of the digital signage player where the media content is associated with the product, and where if the conditional playback engine determines the inventory data is below the pre-determined level, media content is caused to be played on the display that is unrelated to the product.

Implementations and alternatives may involve the running containerized application being configured to transmit instructions to the electronic shelf edge device to generate a human perceptible signal, where the human perceptible signal is one or more of a flashing light, a playing sound, a vibration, a playing audio and/or video, or streaming content, and where when the running containerized application is configured to determine whether to transmit instructions to the electronic shelf edge device to generate the human perceptible signal based on inventory data retrieved by the running containerized application.

According to yet further implementations, a method of deploying and running containerized applications over a digital signage network may include: deploying from a digital signage content management system executed on the digital signage network, a plurality of packaged containerized applications over the network to a digital signage player remotely located from and communicatively coupled to the digital signage content management system, the digital signage player having a processor and memory; and using a containerized application management and communications interface of the digital signage player to install and initialize the plurality of packaged containerized applications into a plurality of running containerized applications, each running containerized application configured to monitor an external computer system communicatively coupled to the running containerized application and to generate monitoring information. A first group of the running containerized applications may be configured to transmit digital signage content to, and to monitor at least one of the group selected from: an electronic shelf edge label system, a pricing system, an inventory system, or an external computer device. A second group of the running containerized applications may be configured to monitor at least a different one from the group selected from: an electronic shelf edge label system, a pricing system, an inventory system, or an external computer device, where monitoring information generated by the first group of running containerized applications includes monitoring information that differs from monitoring information generated by the second group of running containerized applications, and where the monitoring information is transmitted for use by the digital signage content management system.

Implementations and alternatives may involve the monitoring information being collected and a centralized view of the monitoring information is transmitted for display on a display device of the digital signage content management system.

BRIEF DESCRIPTION OF THE DRAWINGS

FIGS. 2-4A illustrate aspects of the computer network of FIG. 1, according to the present disclosure;

FIGS. 4B-4C illustrate displays that may be used in connection with the computer network of FIG. 1, according to the present disclosure;

FIGS. 5-10 illustrate aspects of the computer network of FIG. 1, according to the present disclosure;

DETAILED DESCRIPTION

Provided are systems and methods for managing electronic shelf edge labels (ESLs) and their associated systems via a distributed network for digital signage advertising. ESLs are also referred to as digital price tags and may generally be configured as digital wireless display systems that retail locations may use to show product information such as pricing, product description, inventory level, warnings, and so on. ESLs may be attached to an edge, such as a front edge of retail shelving.

Figure 1:
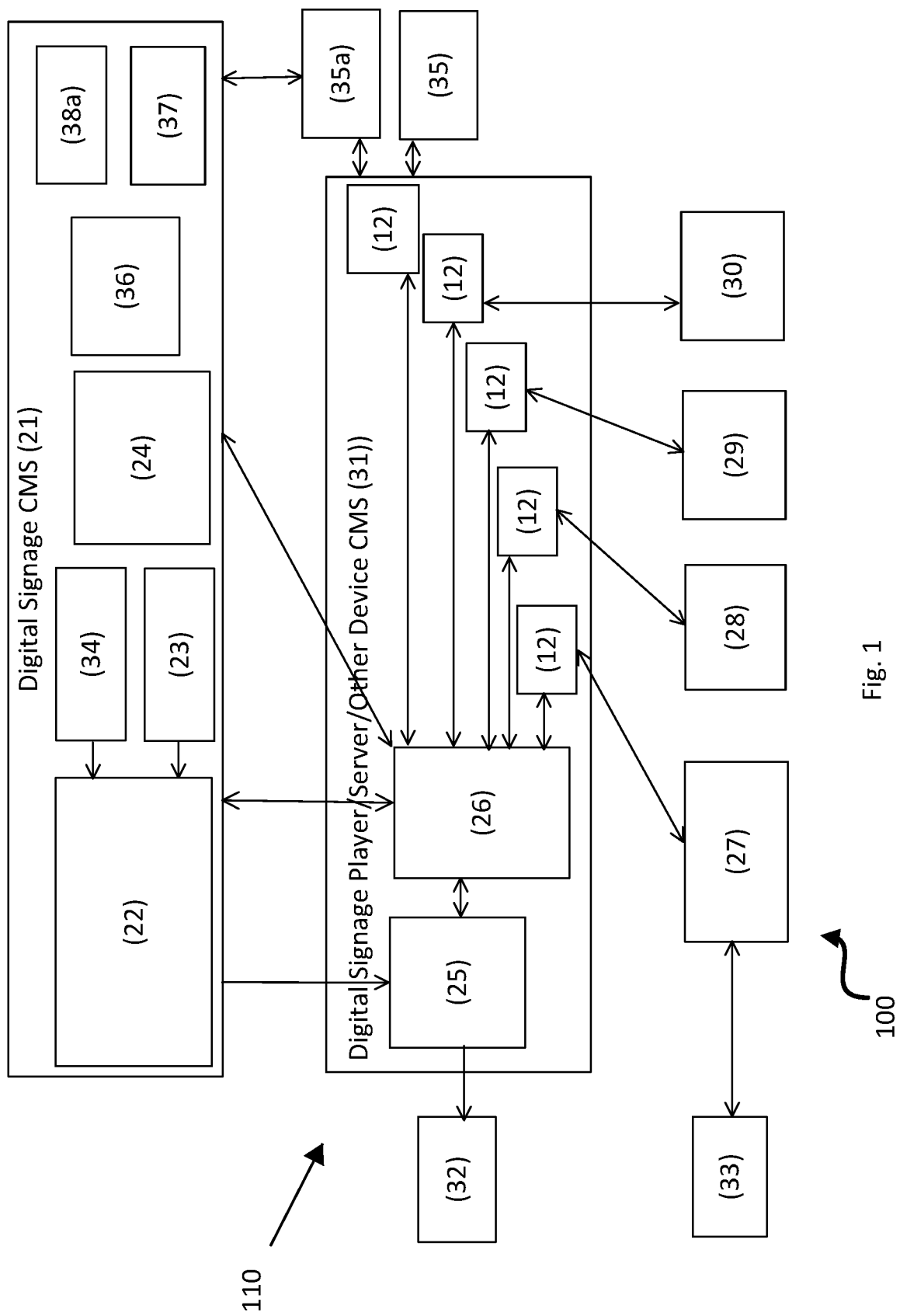
FIG. 1 illustrates a computer network including a digital signage system integrated with computer systems and devices via running containerized applications, according to the present disclosure.

FIG. 1 illustrates a diagram of components of a computer network 100 configured to use running containerized applications 12 to integrate external computer systems and devices (e.g., ESL systems and devices) with a distributed advertising network 110 having a digital signage content management server (CMS) 21 and digital signage players 31, according to the present disclosure. The computer network 100 may be implemented using distributed communication networks including cloud providers, web-based servers such as on-demand web services, and so on. The running containerized applications 12 may be configured to be managed by the digital signage advertising systems of the network 100, according to the present disclosure. A containerization management system 24 of the distributed advertising network may be used to deploy packaged containerized applications 8 to digital signage players 31 and other devices where the containerized applications 8 may be installed and initialized into running containerized applications 12. For instance, memory and CPU of the digital signage player 31 may be allocated to the containerized applications 8 during installation and initialization to convert them into running containerized applications 12.

Packaged containerized applications 8 may be created using a series of internal development steps that include embedding portions of a container communication interface 48, herein referred to as a container interface 48, directly inside of the containerized application, to allow the containerized application to interoperate with a containerized application management and communications interface 26 of the target digital signage player 31 (via the container interface 48) when running, i.e., upon installation and initialization as a running containerized application 12. The prepared containerized applications 8 may be sent as a package to the digital signage player 31, which may download the containerized applications 8 directly from the digital signage CMS 21, when instructed to do so by the digital signage CMS 21 or otherwise. Once downloaded, the containerized application 8 is installed into a virtualized environment 47 of the digital signage player 31. For instance, the digital signage player 31 may install and initialize the containerized application 8 into a running containerized application 12 by informing the virtualized environment 47 that a new, running containerized application 12 is available, and memory and CPU of the digital signage player 31 may be allocated to the running containerized application 12.

The running containerized applications 12 may be deployed and serve as an interface between the digital signage player 31 and an ESL system 27. For instance, the running containerized applications 12 may provide communicative coupling and information sharing between the digital signage CMS 21 or its associated player 31 and the ESL system 27. This integration may also allow the running containerized applications 12 to communicatively couple the ESL system 27 and the distributed advertising network 110 to other related systems such as pricing systems 28 (e.g., POS software), inventory systems 29, and other related systems 30, such as inventory management, customer ordering systems and wayfinding applications. In some implementations, a bridging application may take the place of the running containerized application 12, for instance where an installation does not benefit from the containerization method of the present disclosure.

The digital signage CMS 21 may be in a separate location from the location where the digital signage players 31 reside. For instance, digital signage CMS 21 may be at a corporate office or a third party provider, and the digital signage players 31 may be at a retail store, a bank, and so on. Digital signage players 31 may be configured as a local player (e.g., media player, video players, set top boxes, external computer processors and memory or other digital devices) for transmitting content (e.g., audio, video and images) to one or more communicatively coupled displays 32 arranged at the location where the digital signage players 31 reside. Digital signage players 31 may be configured as one or more computer processors, computing devices, edge computing devices, servers, and the like arranged at a location remote from the digital signage CMS 21. These players 31 may function to communicate with hardware and transmit content for display to components locally and remotely coupled throughout the network 100, as provided herein. Displays 32 may include display screens and hardware and firmware for causing images to be displayed on the display screens and audio to be transmitted. The displays 32 may be one or more large format digital screens, televisions, computer monitors, touch screens, projectors or other display devices configured for displaying content for user viewing such as images, video, audio and video, streaming content, and so on. The displays 32 may include embedded firmware for configuration of the devices, as well as an onboard PC (including a processor and memory) as well as audio capabilities. Handheld devices 35 may be, for instance, used by users 40 of the digital signage CMS 21, by users 45 described herein in connection with FIG. 5 and/or by shoppers 46 described in connection with FIG. 10. The handheld devices 35 may be configured as mobile devices and may include one or more mobile applications that enable the users 40, 45 to interact with the network 100 via the containerized applications 12. In addition, users 40, 45, 46 may use other handheld devices 35a that may be communicatively coupled to the digital signage CMS 21 and to containerized applications 12, which may enable users to receive information, provide input and/or control into various components of the network 100 as described herein.

Figure 2:
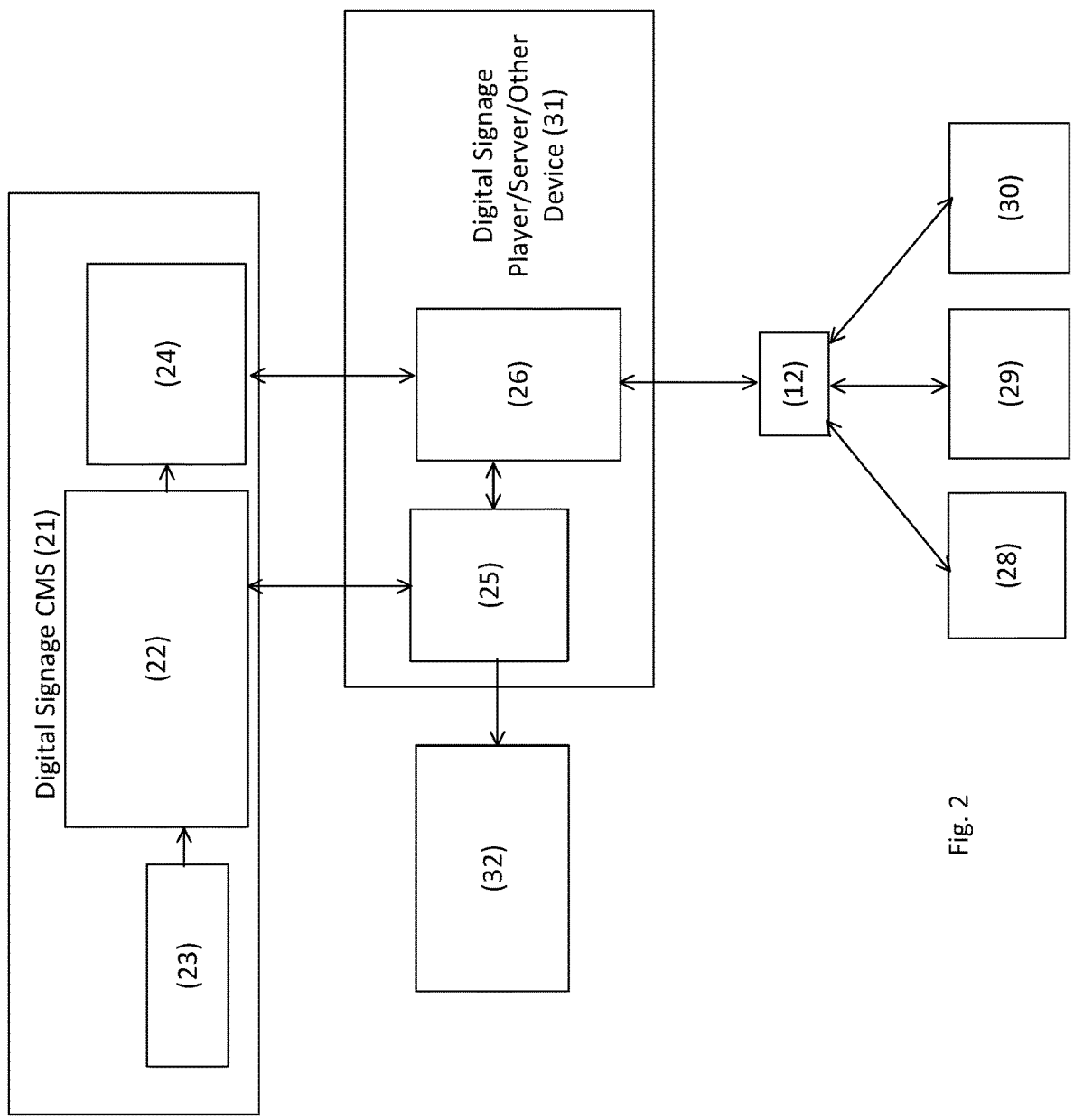

FIGS. 2-10 illustrate aspects of the digital signage system integrated with computer systems and devices, e.g., such as ESL systems 27, via the running containerized applications 12. With reference to FIG. 2, the running containerized applications 12 may enable the systems to interact for conditional playback. A conditional playback engine 23 of the digital signage CMS 21 may be configured to set playback conditions for various media items using the data sets from the communicatively coupled systems. For example, using the inventory system 29, where Product A has a stock level of fewer than 10, then this information may be provided to the inventory system 29 to the running containerized application 12, which transmits this information to the digital signage CMS 21 for programming and scheduling and to a playback engine 25 of the digital signage player 31 via the containerized application management and the communications interface 26 of the digital signage player 31. The playback engine 25 may process the inventory data using conditional playback logic of the conditional playback engine 23 in order to determine whether associated media is to be played or not played on the displays 32 of the digital signage player 31.

Figure 3:
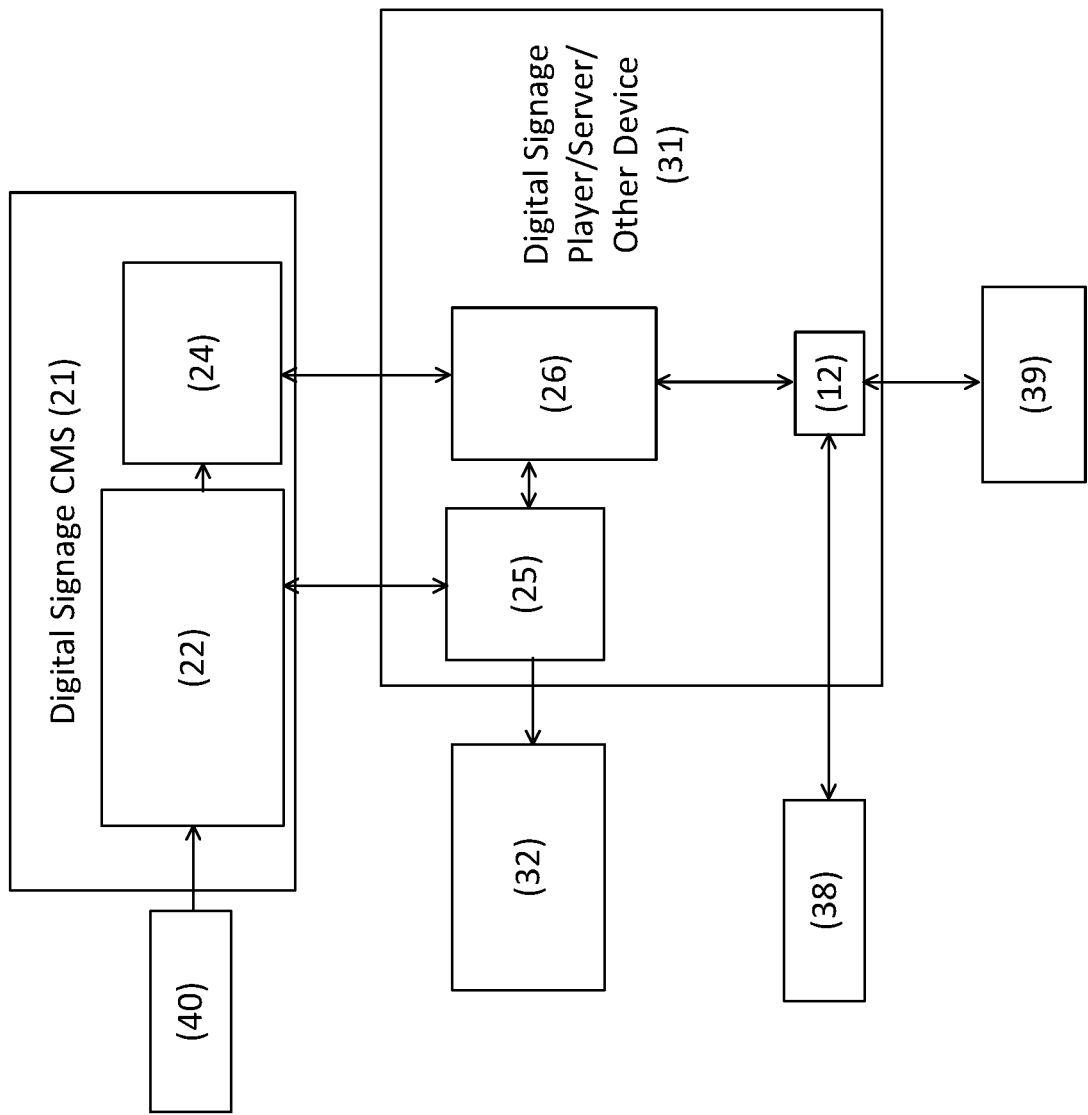

With reference to FIG. 3, digital signage promotion systems may be communicatively coupled to ESL devices 38 of the ESL system 27 and to inventory and marketing data sources 39 via the running containerized applications 12. For instance, users 40 (such as marketing staff) or data driven inputs from an inventory and marketing system 39 may be used to inform the playlists and smart content may be sent to the digital signage player 31. In one example, a media item may be played on the displays 32 to promote a product in inventory. As the content is played via the digital signage player 31, the digital signage media playback engine 25 may simultaneously instruct the ESL devices 38 to generate a human perceptible signal, which signals the location of the product at or proximate the ESL devices 38. For instance, the ESL devices 38 may function to: flash a light thereon (e.g., an LED), play a sound as the promotion for the product plays on the displays 32, play audio and/or video, and/or stream content. In some implementations, the ESL system 27 may include an ESL display 33, which may be an electronic display configured similarly to the displays 32 described herein and may display content, play audio and/or video, such as streaming content similar to displays 32. The ESL display 33 may be communicatively coupled to one or more ESL devices such as via a wired (e.g., network cables) or wireless connection (e.g., Wi-Fi).

Figure 4B:
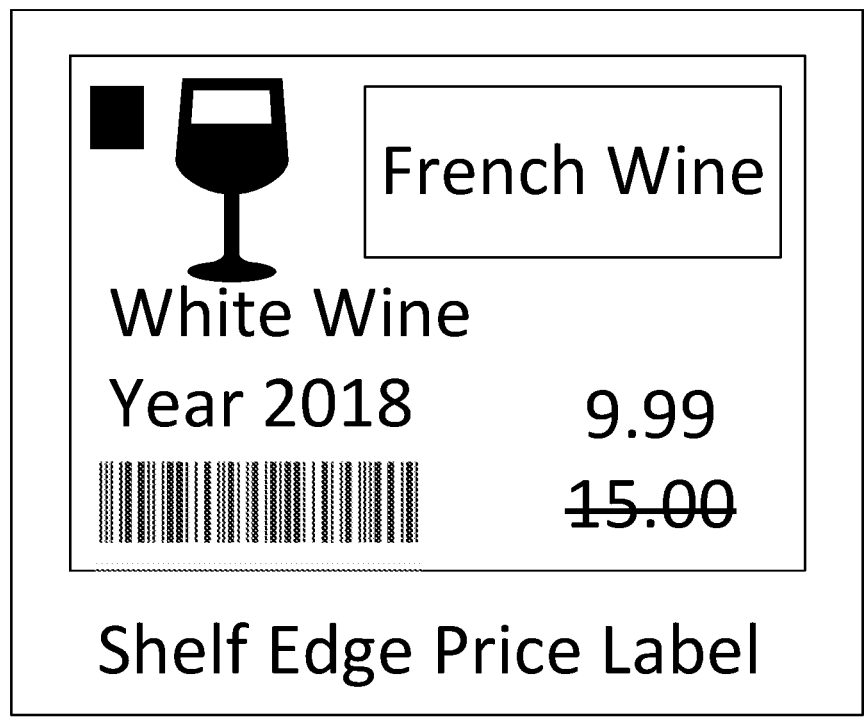

With reference to FIGS. 4A, 4B and 4C, pricing and other product information may be made a part of the digital signage promotions. For instance, with reference to FIG. 4A, playlists and smart content may be sent to the digital signage player 31, e.g., via the user 40 or automatically via the inventory and marketing system 39, for playing on the displays 32. In connection therewith, promotional media with dynamic content 41 may also be displayed. This dynamic content 41 may be content retrieved by the containerized application 12 from the various external systems such as the ESL system 27, the pricing system 28, the inventory system 29, and/or the other related systems 30, and transmitted for subsequent display on the electronic display 32 of the digital signage player 31. For instance, the price of a product may be retrieved by the containerized application 12, e.g., from the pricing system 28, and provided to the promotional media with dynamic data 41 for display on the displays 32, thereby ensuring the correct price is always displayed along with the product promotion content from the user 40 or inventory and marketing system 39. The dynamic content 41 retrieved by the containerized application 12 from the various external systems may also be displayed on ESL devices 38 or other displays, e.g., display 33 of the ESL system 27. In addition to a price of a product, dynamic content includes other data elements such as inventory level, whether or not a legal/compliance graphic should be displayed, such as a not suitable for pregnant women, size of clothing available, special offer data (e.g., BOGO and the like). The dynamic content 41 may be data elements which the media spot incorporates. This may be generally performed using HTML but could be other formats such as generated graphics of the label that updates the display, e.g., of the ESL device 28 or displays 32, 33. For instance in FIG. 4B, a graphical display 380 of an ESL device 38 is depicted with the dynamic content 41 including dynamic data elements such as a price 410 and an original price 412, which may be retrieved from the pricing system 28. The ESL device 38 of FIG. 4B may include a graphical display made up of multiple elements. In some implementations, the ESL device 38 or other displays may be a static display and may display only images or still graphics (e.g., a .jpg, .BMP, etc.). For instance, the static display may be an E-Ink display that shows still graphics. The ESL device 38 or other displays may alternatively be configured as moving displays. Further, the displays 32 may be standard monitors, the ESL devices 38 may be static displays, and ESL displays 33 may be unusual format displays (FIG. 4C) that may form part of the shelf edge fully capable of playing back full motion video and HTML media spots like the capabilities of standard monitors.

With reference to FIG. 5, implementations may provide a home shopper aisle assist. For instance, the digital signage media playback engine 25 of the digital signage player 31 may signal the ESL devices 38 via the running containerized application 12 to generate a perceptible signal, e.g., flashing a LED light, illuminating a screen, generating an audible sound or message, vibrate, transmitting audio and/or video, transmitting streaming content, and so on, to attract the picker/consumer to the product at the corresponding ESL device while the promotion for the corresponding product plays on the display 32 of the digital signage. For instance, where a home shopper places an order, a picker (e.g., a store employee or other person picking physical goods) picks the items for the placed order and uses a handheld device 35 that receives content from a local or remote interface 42 hosted in the digital signage player 31 and/or the digital signage CMS 21, and as the picker navigates the store, the containerized application 12 sends a trigger to the ESL devices 38 for the devices to generate the perceptible signal to attract the picker to enable fast location of the products on the order, thereby speeding up the order fulfillment process. In some implementations, a mobile application may be implemented on the handheld device 35, which may enable the picker to interact with components of the network 100 via the containerized application 12. For instance, the picker may enter input into the mobile application indicating that a product associated with the ESL device 38 has been picked, and the containerized application 12 may cause this information to be communicated to the ESL device 38 to cause the perceptible signal to stop. In addition, the containerize application 12 may cause the remote interface 42, which may be configured as a remote home shopper assist interface, to advance to a next product on the order resulting in another ESL device 38 associated with the next product to activate. In further implementations, the handheld device 35 may be dedicated for use with the network 100 and may not require the mobile application for communicating over the network 100.

Figure 6A:
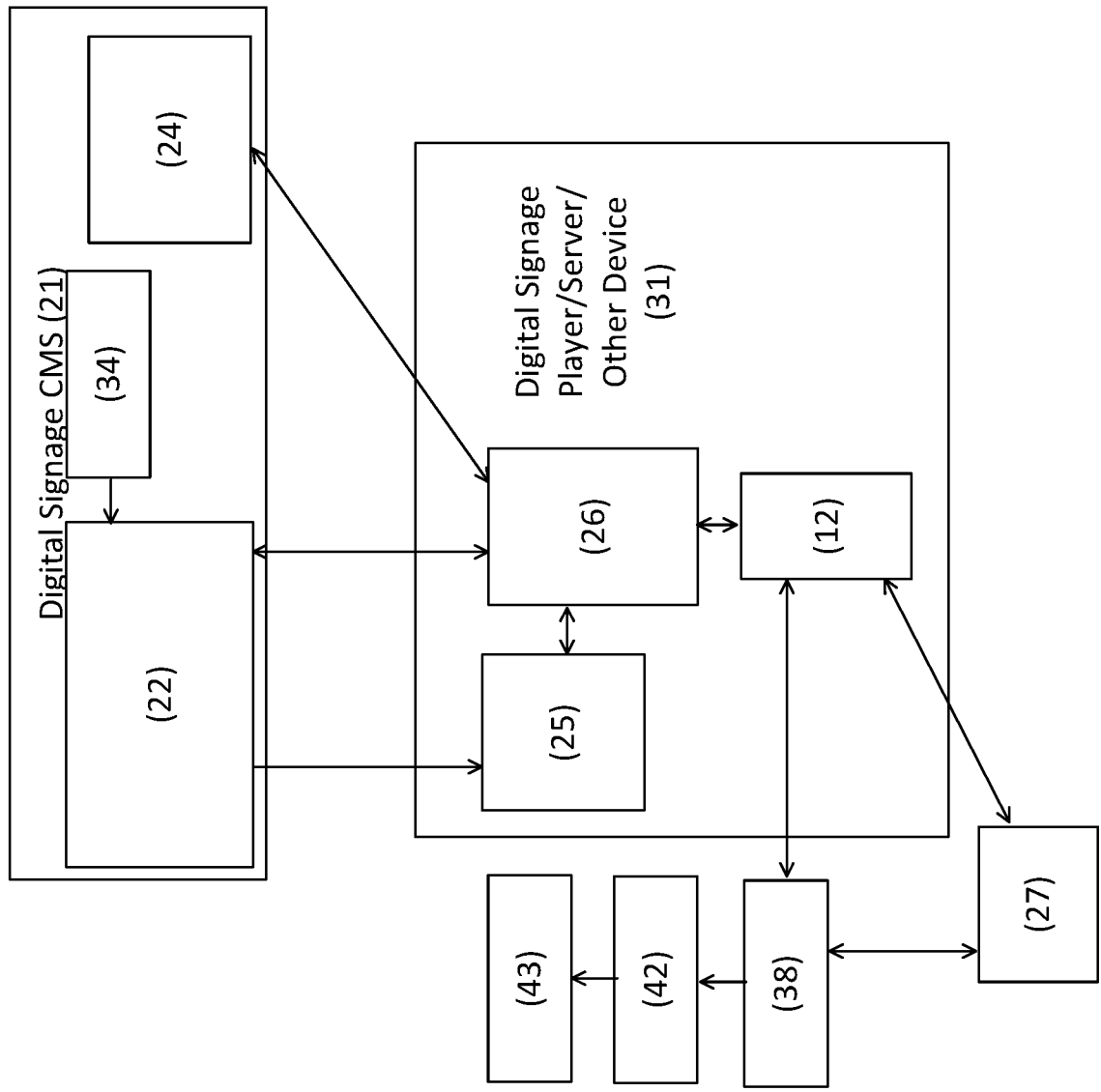

With reference to FIG. 6a, the digital signage CMS 21 may be configured to generate ESL templates 34 and determine how the ESL system 27 will display data on the ESL devices 38 and other ESL system components configured for displaying content. The templates may link areas of the ESL screen to pictures, price, QR code, SKU, product name, stock level, etc. The templates may also set colors of the display for the display area in question. These templates may be configured for and be assigned to multiple sites, e.g., multiple client locations, and ESL devices 38 through the digital signage CMS 21 interface. The containerized application 12 may be responsible for updating the ESL devices 38 either directly or via the existing ESL system 27. The template design may also show QR code content 42, and upon scanning the QR code, the client (e.g., consumer/picker) may be linked to a website for additional information on the product 43.

Figure 6B:
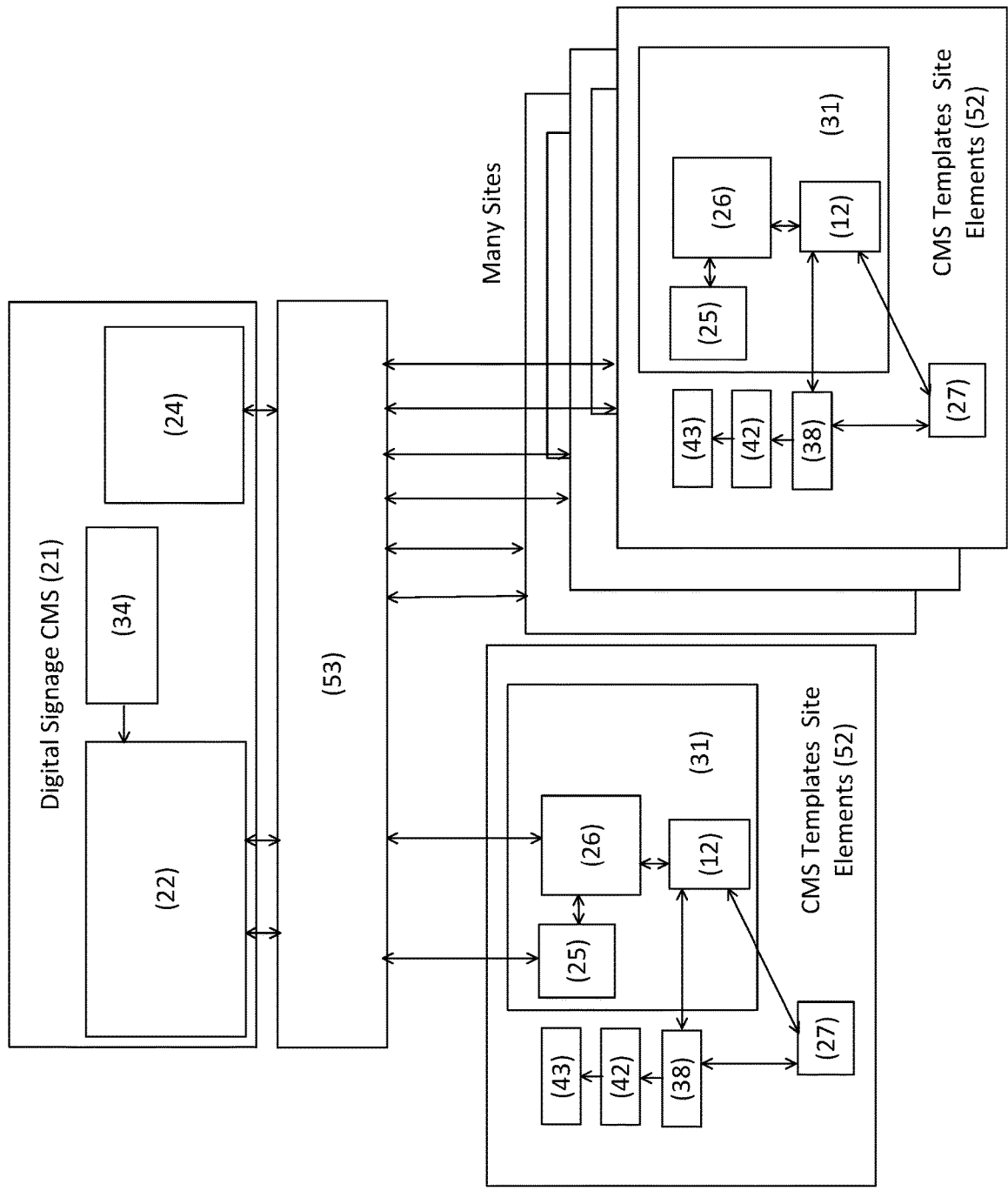

With reference to FIG. 6a, illustrated are various client sites remotely located from one another, and each of which include the CMS templates site elements 52 necessary to receive and play the templated content from the centralized update of decentralized ESL and display templates 53. FIG. 6b also shows how the various separate site infrastructures are able to be targeted with templates simultaneously, and the centralized update of decentralized ESL and display templates 53 ensures that the targeted sites and infrastructure receive and confirm reception from a single centralized interface, thereby amalgamating the singular CMS template site elements 52 in to a single infrastructure, as far as the user is concerned. For instance, in systems where there are controlling boxes at the various physical sites, and where centralized template creation capabilities (e.g., choosing where the price will appear, as opposed to the inventory numbers and what color they will be) are not available, the centralized update of decentralized ESL and display templates 53 may provide a single interface at a central digital signage CMS 21 that allows the user to select the various endpoints to which the template update will be sent, thereby allowing a single template creation event to be used in many endpoints, all controlled centrally.

Figure 7A:
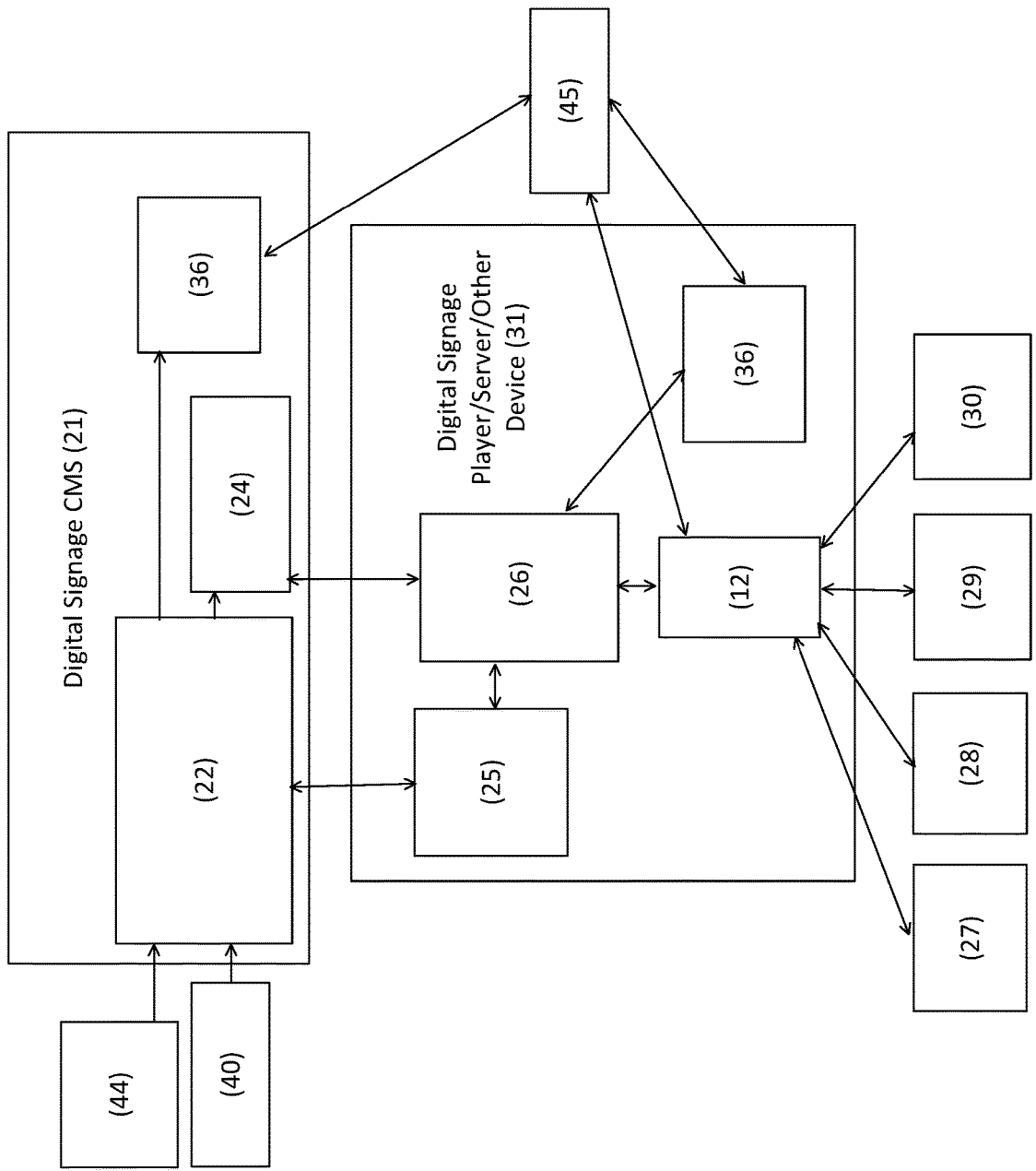

With reference to FIG. 7a, a real time store preview may be provided by the digital signage CMS 21 storing a map of the retail site. Using the inventory system 29, pricing system 28, planograms 44 and any other related systems 30, a graphical, pictorial, video and audio preview of the site screens and displays may be previewed by users 45 using a local or remote interface hosted in the digital signage player 31 or digital signage CMS 21 using the real time store preview interface 36 or separate containerized application 12 of the digital signage CMS 21. The real time store preview interface 36 may use the store map and real time information on stock levels, what's playing where, which devices are working and not working etc. The user may virtually walk through the store and view the various screens as they proceed using the real time store preview interface 36.

Figure 7B:
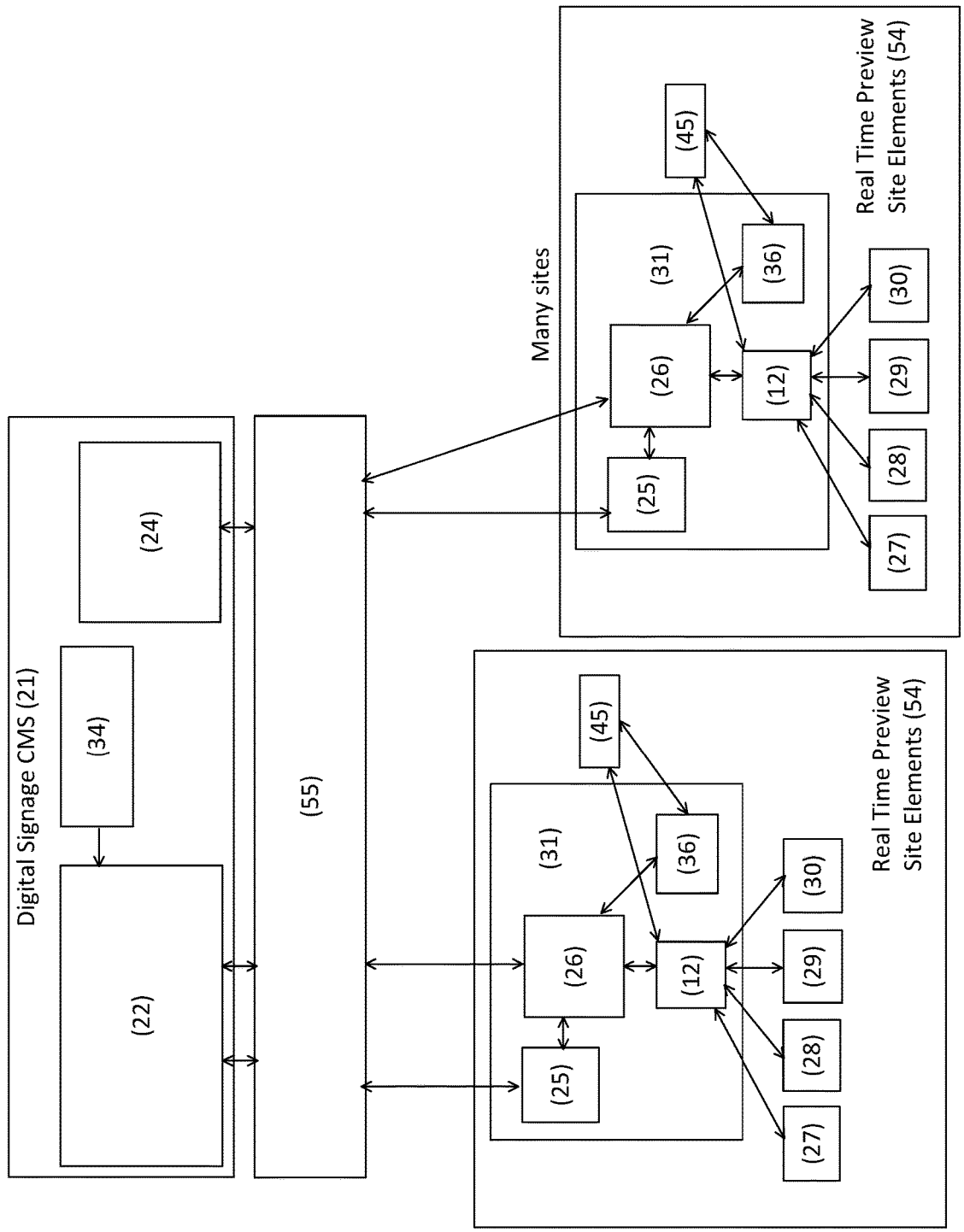

With reference to FIG. 7b, the diagram shows how the various client sites include the real time preview site elements 54 necessary to enable a centralized view of decentralized site infrastructure. Data from the real time preview site elements 54 may be centralized, thereby amalgamating the singular real time preview site elements 54 through the centralized preview of decentralized display devices 55 into a single infrastructure as far as the user is concerned. The various sites' data and content is thereby viewable in the centralized real time store preview interface 36 of the digital signage CMS 21.

Figure 8A:
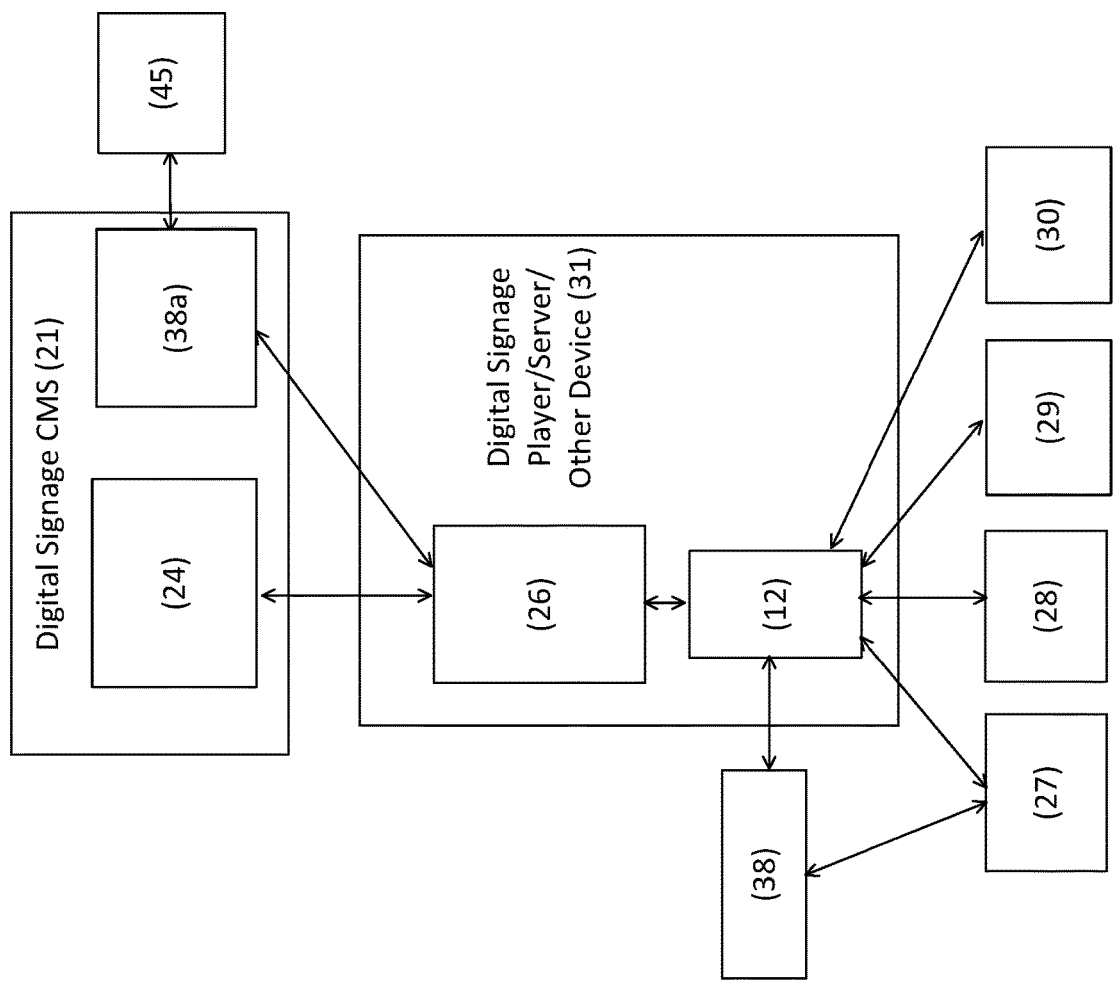

With reference to FIG. 8a, the running containerized application 12 may be used in connection with monitoring communicatively coupled devices, e.g., ESL devices 38 and systems, such as the ESL system 27, pricing systems 28, inventory systems 29, and other related systems 30, each of which may report status information to the running containerized application 12, and the reported status information may be transmitted to the digital signage CMS 21 and made available to the system health data 38a module. The system health data module 38a may thereby enable users 45 to monitor all devices through a single, centralized system health data module 38a interface.

Figure 8B:
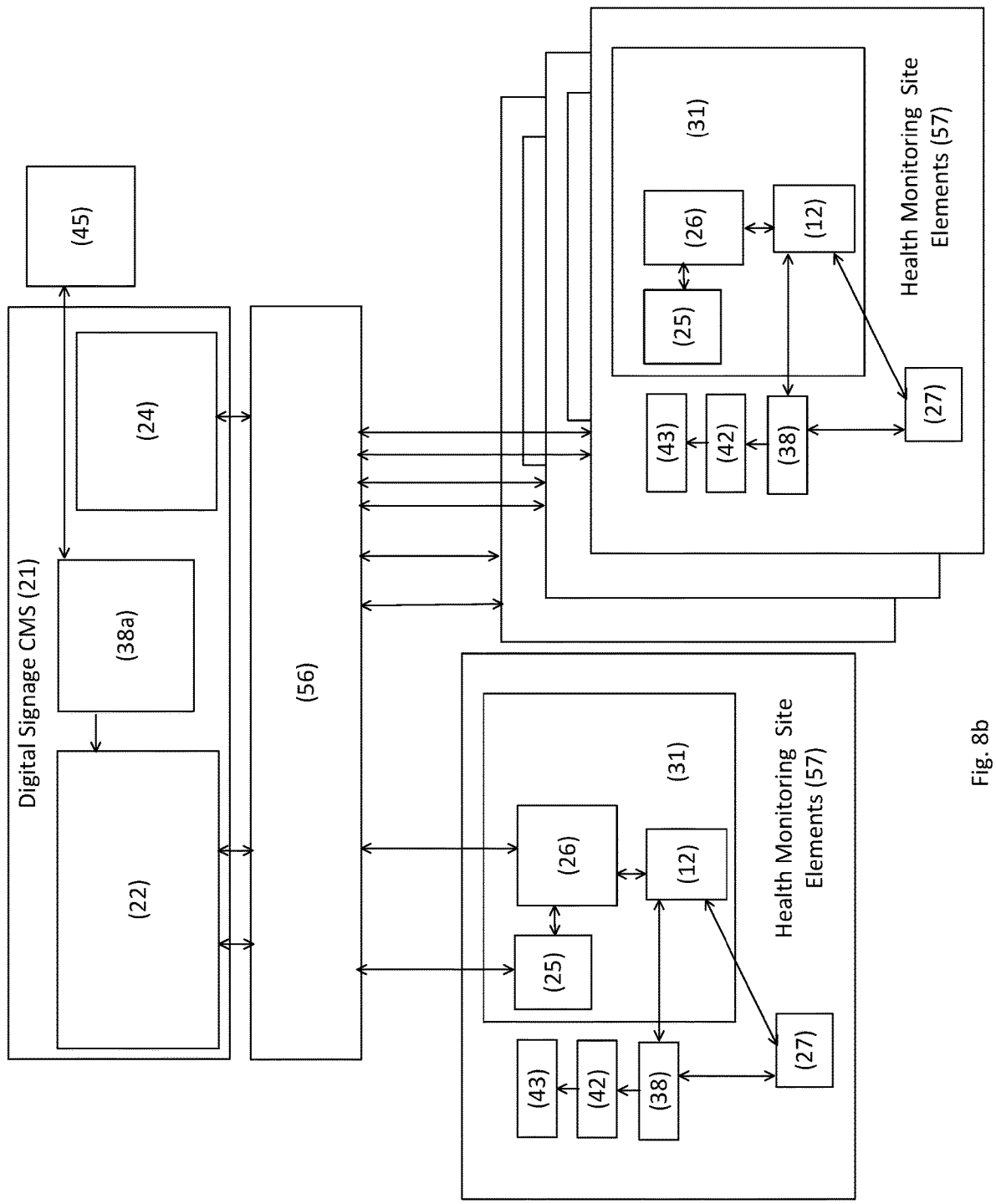

With reference to FIG. 8b, the diagram illustrates the various client sites remotely located from one another, each including the health monitoring site elements 57 necessary to enable a centralized view of decentralized site health, according to the present disclosure. Data from the health monitoring site elements 57 may be transmitted to the centralized update of decentralized monitoring data module 56 of the digital signage CMS 21, to thereby amalgamate the singular health monitoring site elements 57 into a single infrastructure, as far as the user 45 is concerned. The various sites' health data and content may thereby be viewable in the centralized system health data 38a interface of the digital signage CMS 21. Device information reported to the running containerized application 12 for use by the system health data module interface 38a may include, but is not limited to, the physical status of the device, battery levels, temperature, signal strength being received, screen reporting correct display health. In addition, the devices may report on update status, whether jobs set to the devices (e.g., displays or players) have been processed and "played", whether the device is online or offline, whether some or all network elements are working, screen capture data, and so on.

Figure 9:
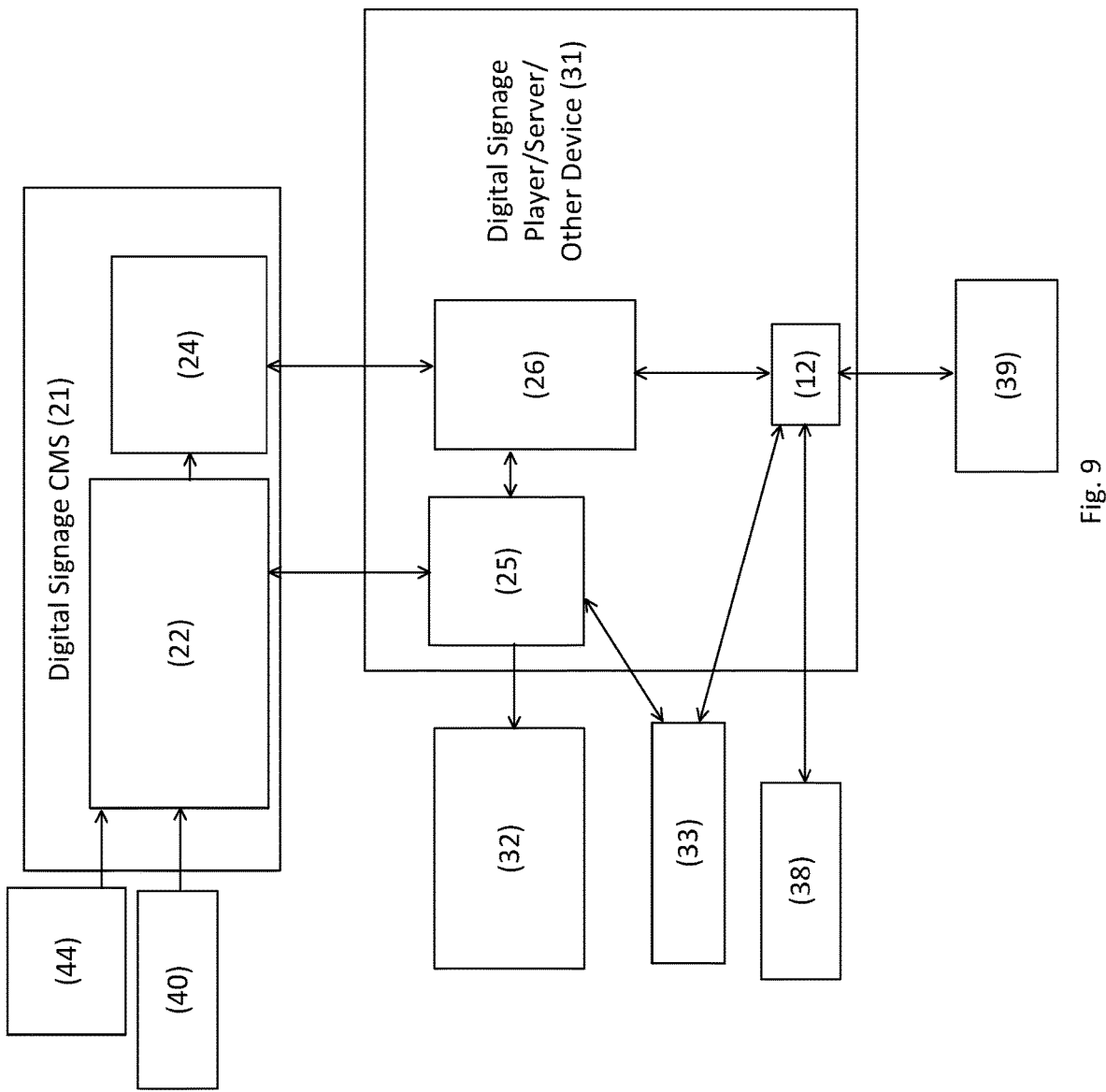

With reference to FIG. 9, the diagram shows aspects for linking media playback. Media assets may be linked in the digital signage CMS 21 to displays 32 of the digital signage player 31, which may be positioned at end caps, as well as to ESL displays 33 of the ESL system 27 at various site locations so that relevant content such as targeted ads for a particular product associated with a corresponding ESL device 38 may play in those locations without the need for scheduling intervention from the digital signage scheduling engine and API 22 of the digital signage content management system 21. Data driven inputs from inventory systems 29 and marketing systems 39 and planograms 44 may provide content for generating playlists, and smart content may be sent to the digital signage player 31 to play on the screens 32. For instance, a media item may play to promote a product on the displays 32 based on the locations of the various displays 32, 33 and a location of the product in the store.

Figure 10:
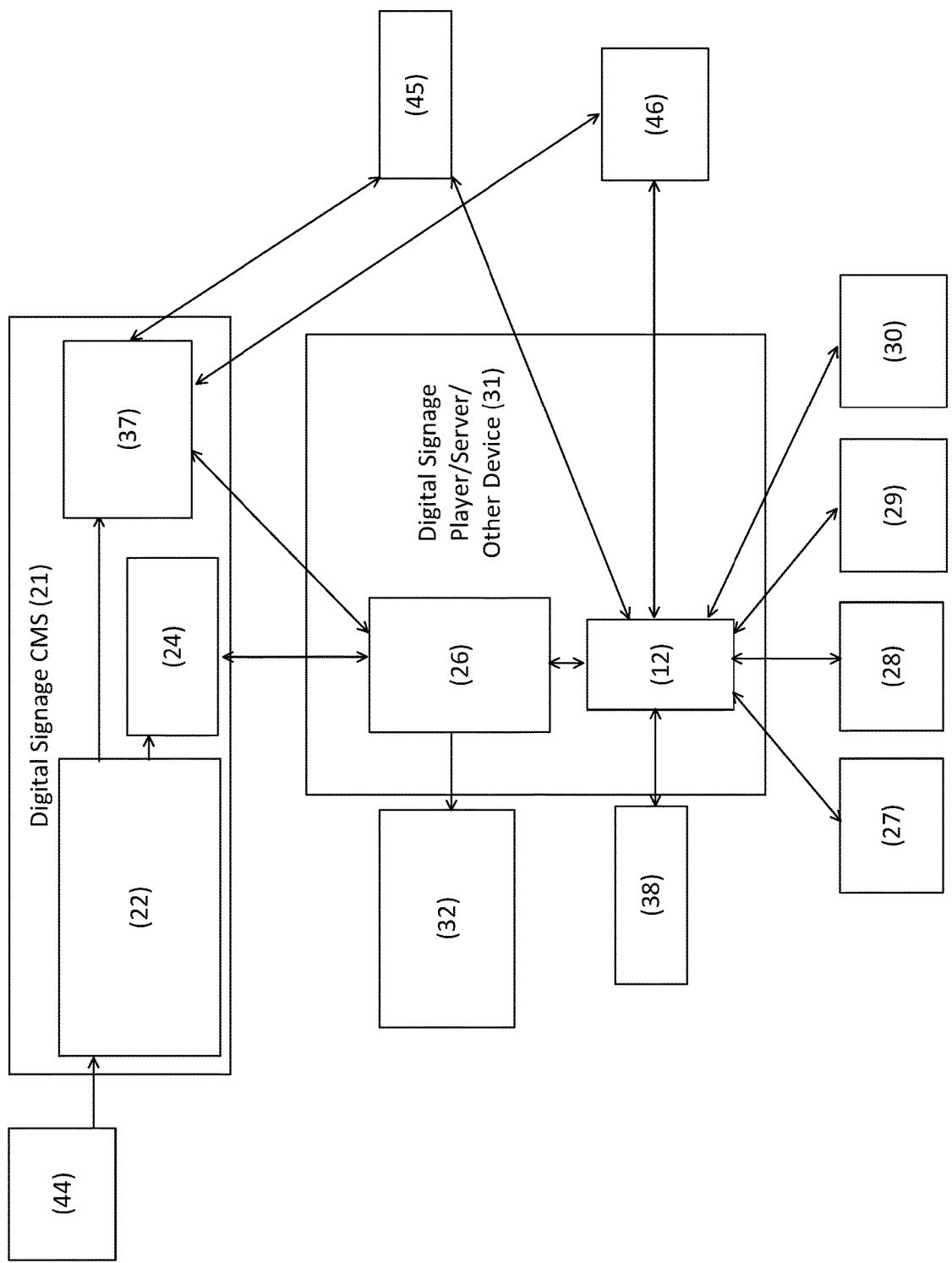

With reference to FIG. 10, product wayfinding may be used by shoppers 46 (e.g., consumers or pickers) and users 45 (e.g., store employees or pickers) by using a device (e.g., a handheld device 35, 35a) to access the product wayfinding interface 37 of the digital signage CMS 21 via a local interface or remote interface hosted in the digital signage player 31 in a containerized application 12 or in the digital signage CMS 21 in order to be directed to products after first identifying them from an electronic shopping list or a customer order or inquiry. The stock level may also be reported to avoid navigating to product locations where no product remains in stock. As the clients (e.g., 45, 46) approach aisles the device 35, 35a may be detected, and displays 32 located on aisle endcaps may display information directing the clients to the appropriate aisle before other triggers are activated, such as wayfinding directions and perceptible signals generated by the ESL devices 38 that hone the client in on the actual product location, and thus the physical product. Related products may also be shown on the aisle screens (romaine lettuce and croutons if Caesar dressing is the searched product, for example) to act as a reminder to the client.

Figure 11:
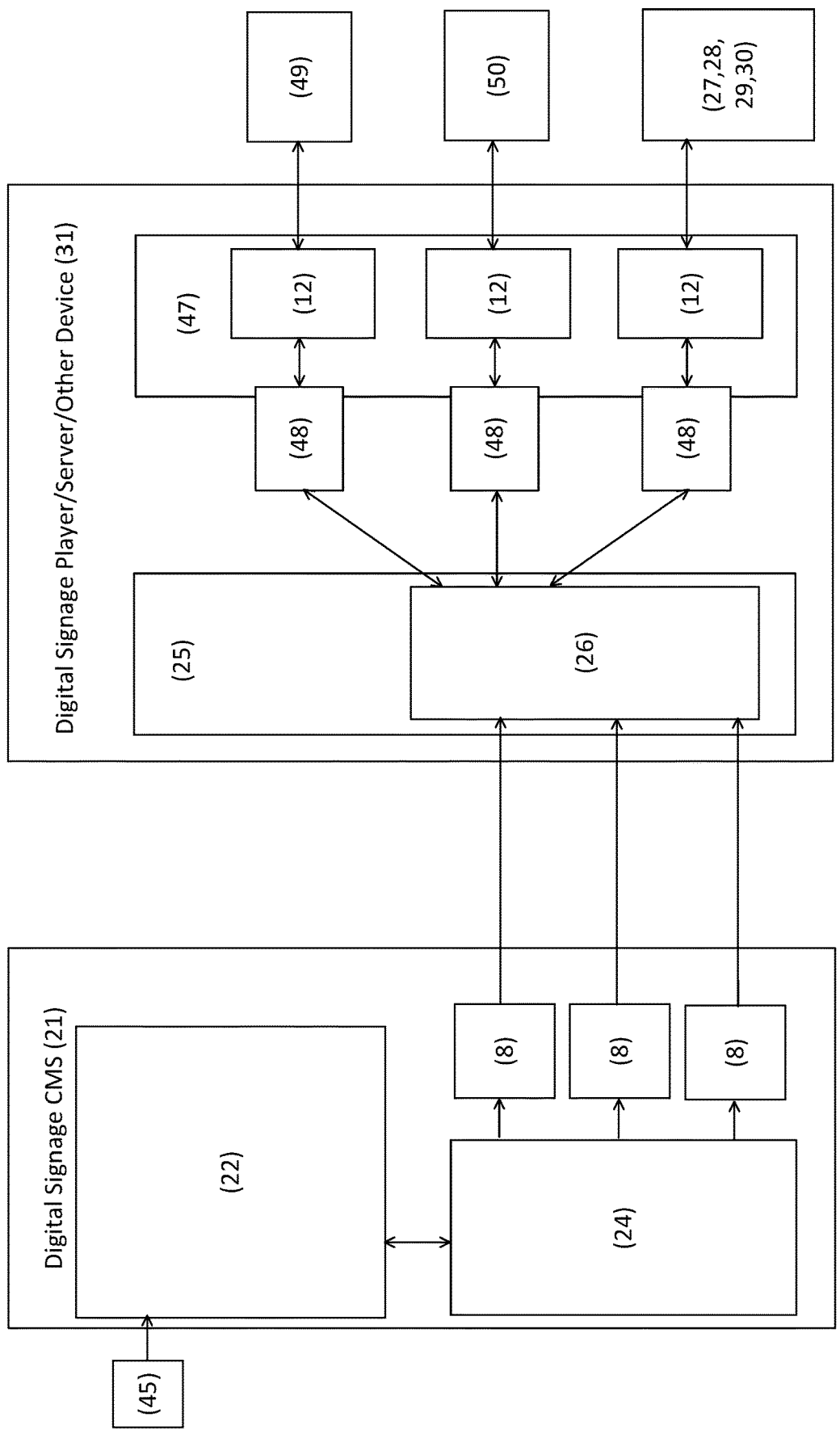
FIG. 11 illustrates aspects of the computer network that may be used in connection with executing containerization methods, according to the present disclosure.

With reference to FIG. 11, the containerization methods of the present disclosure are described along with illustrated aspects of the computer network 100 that may be used in connection with executing such methods. The containerization methods may be employed for receiving, generating and distributing content, such as for generating instructions for and monitoring responses of network components coupled thereto, and for generating and distributing monitored content to other network components.

In FIG. 11, the computer network 100 employs containerization components including, but not limited to: the packaged containerized applications 8 and the containerized application management module 24 of the digital signage CMS 21, along with the containerized application management and communications interface 26, the running containerized applications 12, the virtualized environment module 47, and the container interface 48 of the digital signage player 31.

Containerization methods may be employed separately from core services such as media playback engine 25 and the containerized application management and communications interface 26 of the digital signage player 31. This may facilitate ESL integration into the network 100 (FIG. 1) including integration of the ESL components such as the ESL system 27, the ESL devices 38, the ESL displays 33. This approach to employing containerization methods may allow for a faster development cycle as each containerized application 12 may be separately tested and deployed without impacting other components of the network 100.

A central roll out management and monitoring system may be provided in the network 100 using the digital signage CMS 21 including its digital signage scheduling engine and API 22, the containerization application management 24, and the packaged containerized applications 8. Use of these network components may ensure a coordinated system controls all aspects of the deployment and health of the packaged containerized applications 8. A description of the central roll out management and monitoring system follows.

Files may be initially uploaded to the digital signage CMS 21 by users, and the files may be processed and stored into memory. The information may be used by the containerization application management 24 of the digital signage CMS 21 to generate deployable packaged containerized applications 8. The digital signage scheduling engine and API 22 of the digital signage CMS 21 may be used to target the packaged containerized applications 8 for routing to the remotely located digital signage players 31 in the network 100 distributed across one or more client networks. The packaged containerized applications 8 may be delivered to the digital signage players 31 over the network 100, e.g., via internet, over a wide area network, a local area network, using physical media, and so on. Each digital signage player 31 may include a containerized application management and communications interface 26, which may be a component of the digital signage media playback engine 25. The containerized application management and communications interface 26 may be configured for receiving the packaged containerized applications 8 from the digital signage CMS and for both setting up and configuring a virtual environment 47 for each of the received packaged containerized applications 8, as well as for generating the running containerized applications 12. Once installed and started, the containerized applications 8 are considered to be running containerized applications 12. The running containerized applications 12 may communicate via the containerized application management and communications interface 26 to the digital media playback engine 25, the digital signage CMS 21 and other deployed running containerized application 12 instances. The running containerized applications 12 may send instructions to other computer systems such as the ESL system 27, pricing system 28, inventory system 29, and/or other related systems 30, as well as external attached physical devices 49 (e.g., screens, speakers, cell phones, tablets, wireless video transmission hardware, lighting, air conditioning/HVAC equipment, door controls, remote control devices) and internal physical devices 50 (e.g., firmware updates, system BIOS, system settings, system drivers, hard drives, serial and USB communication ports). Running containerized applications 12 may also provide APIs and web interfaces to allow other computer systems, e.g., such as those previously mentioned, e.g., 27, 28, 29, 30, to interact with the running containerized applications 12, with the digital media playback engine 25, with the digital signage CMS 21 and with other deployed running containerized application 12 instances (e.g., wayfinding, interactive kiosks, sensor control systems, HVAC control system software, security system control software, etc.).

The running containerized applications 12 may communicate directly with an attached physical hardware device 49, an attached internal physical device 50, or an external computer system 27, 28, 29, 30 for the purposes of data exchange and/or data acquisition. The running containerized applications 12 may be purpose specific, in that they may be uniquely written to interact with the attached hardware or systems, e.g., 49, 50, 27, 28, 29, 30. In some cases, the running containerized applications 12 may be configured to transmit video and audio output to the externally and internally attached hardware or systems 49, 50. The running containerized applications 12 may be configured to provide streaming media outputs for playback on consumer grade and professional grade media playback equipment, such as the ESL displays 33 and displays 32.

The running containerized applications 12 may access information from the digital signage player 31 by communicating via the containerized application management and communications interface 26 of the digital signage player 31. This communication channel is internal to the digital signage player 31 and allows the running containerized applications 12 to execute local actions such as logging, error reporting, accessing local configuration information on the digital signage player 31 itself and sharing the information between other running containerized applications 12.

Each running containerized application 12 may be contained within its own virtualized environment 47. This virtualized environment 47 may take advantage of advanced CPU and operating system capabilities to physically restrict the amount of resources of the digital signage player 31 that can be used by the running containerized applications 12. This includes, but is not limited to, CPU resources (limiting the number of CPU's that are assigned or limiting the percent of CPU time is allocated), memory (physical memory on the digital signage player 31) and storage space (physical storage on a local storage medium, such as a locally installed hard drive). By using a virtualized environment 47 to host the running containerized applications 12, the containerized application management and communications interface 26 may ensure that any localized failure of installed running containerized application 12 (for example the inability to communicate with external hardware or system which could generate a failure state within the running containerized application 12 and render the containerized application inoperable) is contained within the virtualized environment and cannot cause a general failure of the entire digital signage player 31. The isolated virtualized environments 47 may thus ensure that the digital signage player 31, the digital signage media playback engine 25 and other running containerized applications 12, cannot be affected while in their running state.

The containerized application management and communications interface 26 may be responsible for all intercommunications between all containerized applications and the digital signage media playback engine 25 and the digital signage CMS 21. Running containerized applications 12 may also connect to other systems directly (e.g., previously described devices and systems 49, 50, 27, 28, 29, 30) or through the containerized application management and communications interface 26.

Figure 12A:
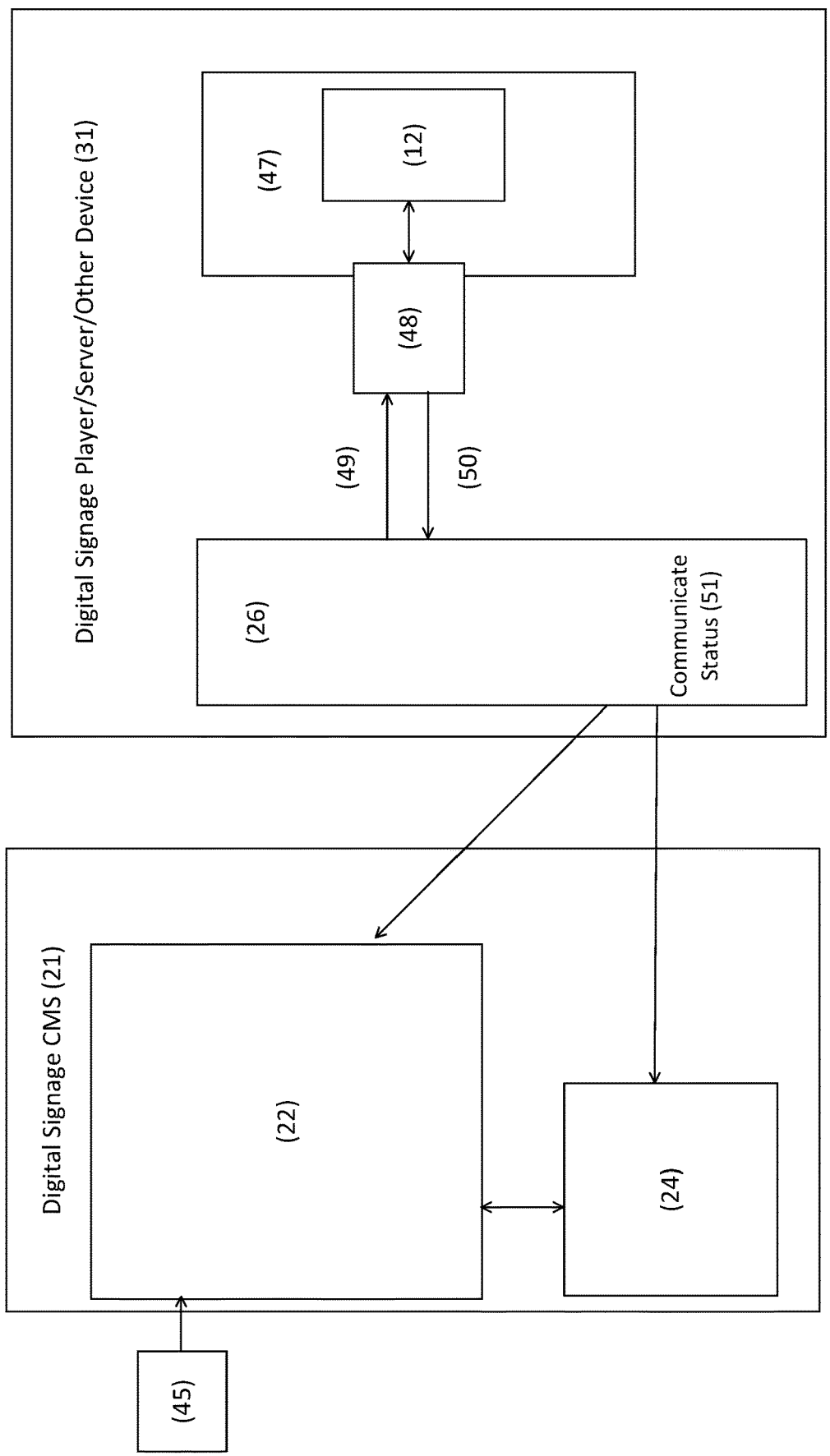
FIG. 12*a* illustrates aspects of the computer network for implementing a container application management and monitoring method, according to the present disclosure.

With reference to FIG. 12*a*, a container application management and monitoring method is described along with illustrated aspects of the computer network 100 (FIG. 1). In FIG. 12*a*, the containerized application management and communications interface 26 of the digital signage player 31 may be responsible for managing the virtualized environments 47 by performing the start, stop, creation and management operations of virtualized environments 47. Some of these operations may include, but are not limited to, creating new virtual spaces, changing the operating configurations of the running virtual environment and removing existing virtual spaces. In addition, the containerized application management and communications interface 26 may be responsible for collecting status and running statistics 50 of each virtualized environment 47 and for communicating status 51 details back to the digital signage CMS 21 or its containerized application management 24 for display and/or alerting purposes. The containerized application management and communications interface 26 may also attempt to restart any failing applications or systems such as a failing running containerized application 12.

Figure 12B:
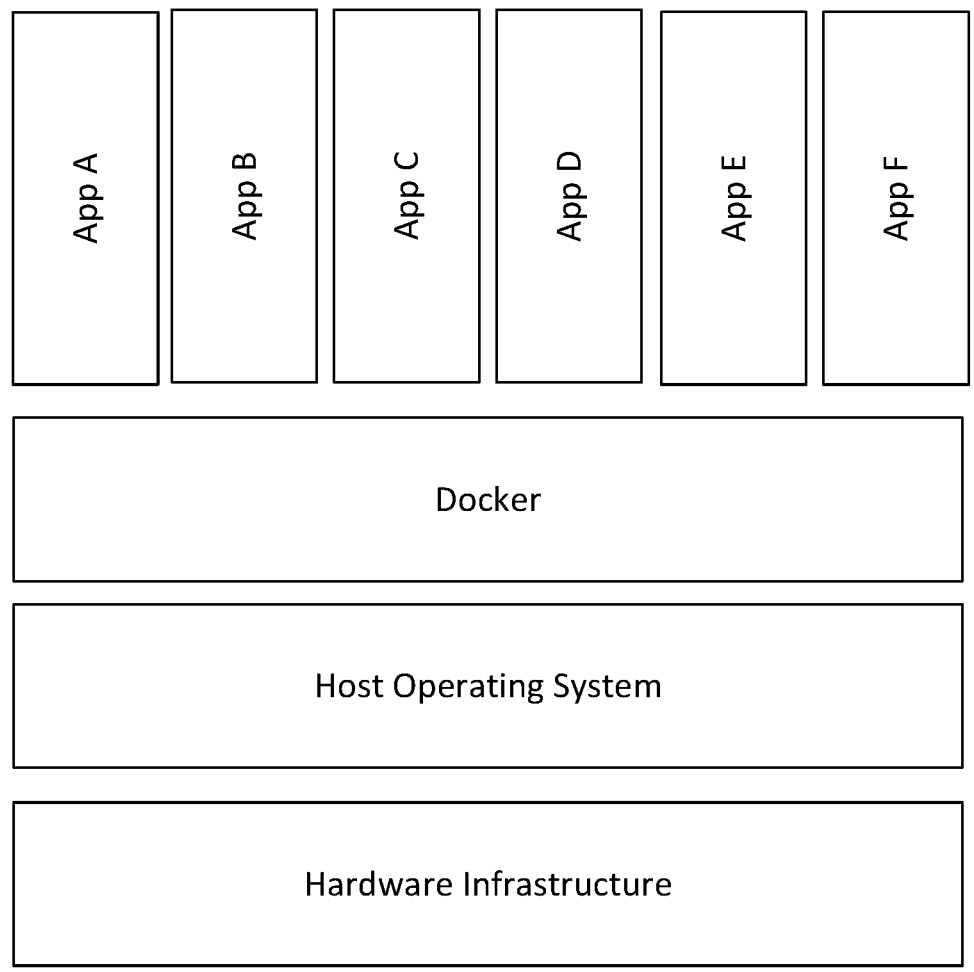
FIG. 12*b* illustrates a container that may be used in connection with the computer network, according to the present disclosure.

With reference to FIG. 12*b*, a container 1200 is illustrated that may be used in connection with the computer network 100 (FIG. 1). The container 1200 is a standard unit of software that packages up code and all its dependencies so the application runs quickly and reliably from one computing environment to another. FIG. 12*b* more particularly represents a Docker container. A Docker container image is a lightweight, standalone, executable package of software that includes everything needed to run an application, e.g., code, runtime, system tools, system libraries and settings. Container images (e.g., containerized applications 8) become containers at runtime (e.g., running containerized applications 12), and in the case of Docker containers, images become containers when they run on a Docker engine. Containerized software runs the same, regardless of the infrastructure. That is, containers isolate software from its environment and ensure that it works uniformly despite differences, for instance, between development and staging.

Figure 13:
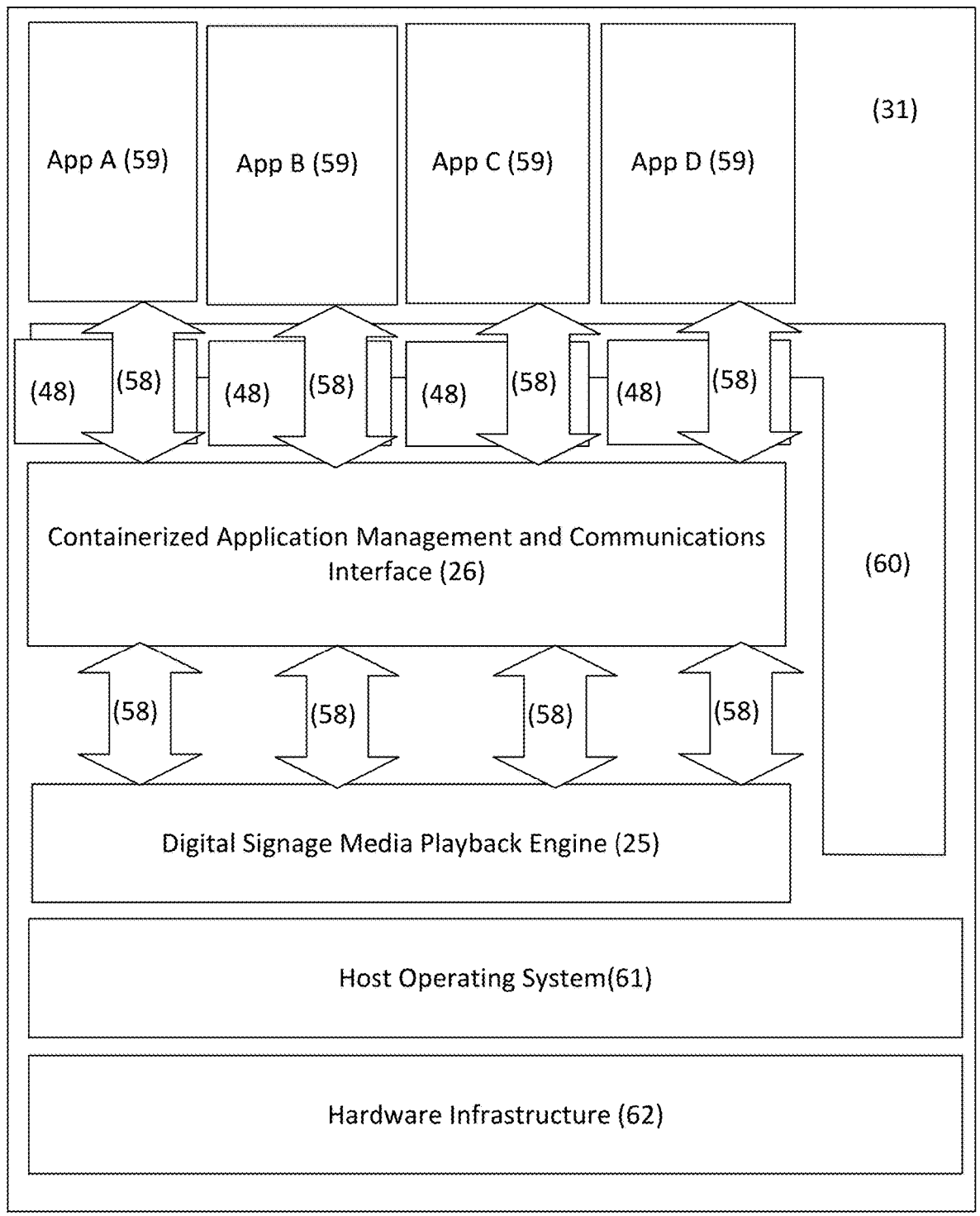
FIG. 13 illustrates a digital signage player including a Docker container; according to the present disclosure.

With reference to FIG. 13, illustrated is a digital signage player 31 including a Docker container 60 that may be employed according to aspects of the present disclosure. The Docker container may include a container interface 48, which may be responsible, among, other things, for acting as a bi-directional conduit 58 for event messages and data that flow to and from the container hosted applications 59, e.g., the applications running within the running containerized applications 12. For instance, with reference to FIG. 15, the running containerized application 12 may include the container interface 48, the bi-directional conduit 58, and the container hosted applications 59 incorporated therein. The container interface 48 may be partially contained inside the container hosted application 59, while the bi-directional conduit 58 couples to the container application via the container interface 48, which may serve as a bridge between internal communications of the running containerized application 12 and external components coupled thereto, such as the digital signage media playback engine 25 of the digital signage player 31. Events may also flow from the digital signage media playback engine 25 into the container hosted applications 59 via the container interface 48 and the bi-directional conduit 58, that may then be acted upon by the container hosted application 59 that is operating inside of the running containerized application 12. An example is shown in FIG. 14.

Figure 14:
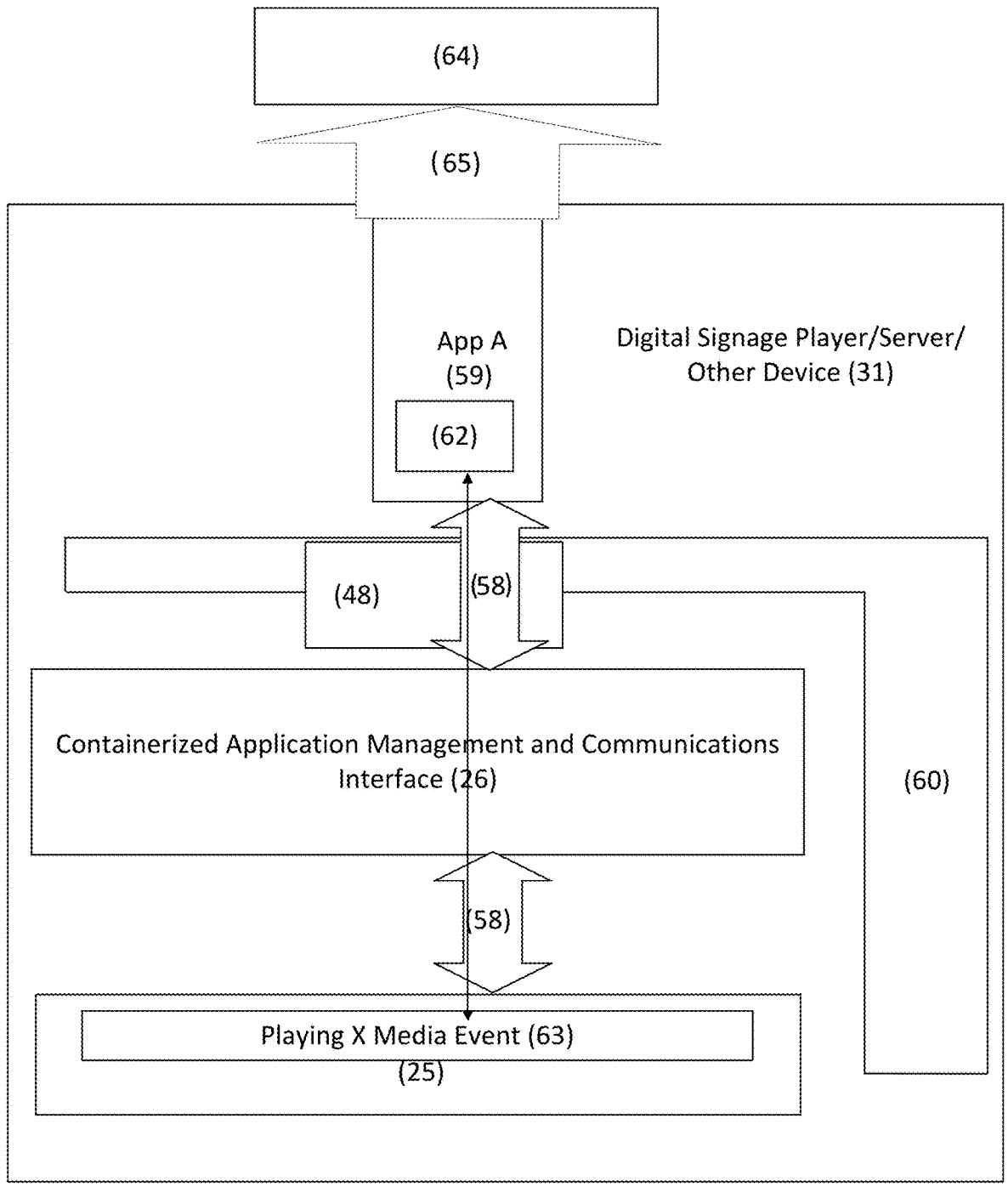
FIG. 14 illustrates an event notification process using components of the computer network, according to the present disclosure.
Figure 15:
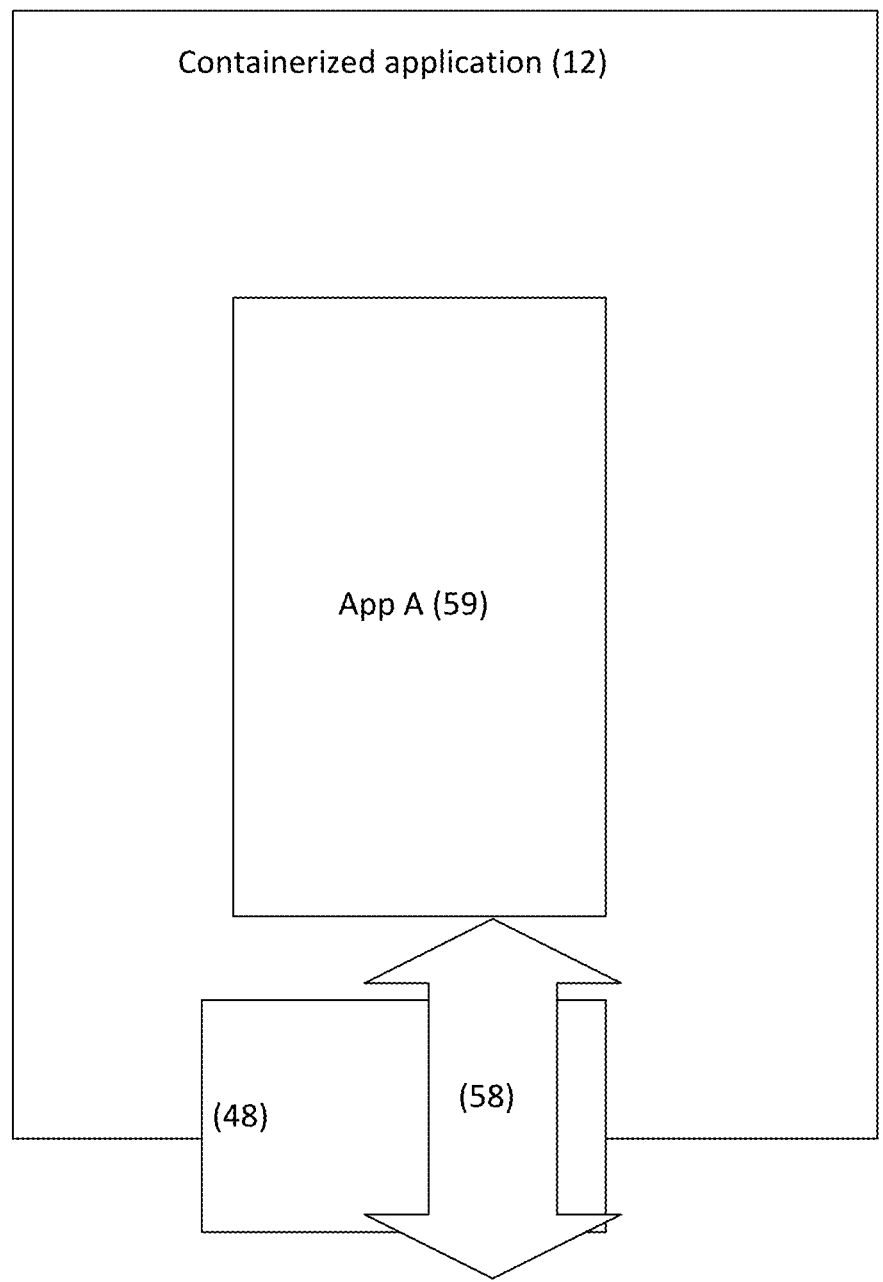
FIG. 15 illustrates a running containerized application, according to the present disclosure.

With reference to FIG. 14, illustrated is an event notification process for linking a piece of media playing back on a digital signage media playback engine 25 to a human perceptible signal generator configured as an ESL LED flash function 64 of an ESL device 38 of the ESL system 27, which causes the LED to flash when the linked media plays. A Playing X Media Event message/trigger 63 may be sent indicating that the digital signage media playback engine 25 is about to play a specific piece of content X on the screen 32, 38 of the digital signage player 31. The Playing X Media Event message/trigger 63 may be sent from the digital signage media playback engine 25 to the event listener 62 of the container hosted application 59 via the bi-directional conduit 58, and the containerized application management and communications interface 26 and the container interface 48 as illustrated in FIG. 14. For instance, the event listener 62 monitors for a "FLASH LED" event from the digital signage media playback engine 25 and Playing X Media Event message/trigger 63, the message/trigger 63 may be set to trigger in the content spot or as an event in the digital signage media playback engine 25 programmed at the playlist level in the digital signage CMS 21. In response, the containerized application 59 may trigger the LED to flash on the ESL Tag of ESL Tag flash function 64. The Playing X Media Event 63 may be sent to one or many of the containerized applications 59. It may also be sent to any or all containerized applications 59 and the containerized application 59 may determine whether to use the event or not based on its functionality.

In FIG. 14, the Playing X Media Event 63 may then be used by the container hosted application 59 to use its own logic to trigger its own specific behaviors and actions in response to various received events. Conversely, events may flow from container hosted applications 59 to the digital signage player 31, e.g., via the container interface 48, the containerized application management and communications interface 26, digital signage media playback engine 25 through the bi-directional conduit 58. Sending events from the container hosted application 59 to the digital signage player 31 may trigger certain actions within the player itself. An example of this would be a container hosted application 59 initiating playback of a piece of media by the digital signage media playback engine 25. Another example would be software fixes, upgrades and hardware control events such as power cycles, configuration changes, fixes and the like on the digital signage player 31 and its hardware 62 and host operating system 61.

In addition to events, specific data objects may be transmitted from the container hosted application 59 into the digital signage media playback engine 25. Examples may include logging and auditing messages. These messages may in turn be added to the digital signage media playback engine 25 logging and auditing database, which may then be reported back to the digital signage CMS 21. In addition to logging and auditing, other data values may be transmitted to the digital signage media playback engine 25, for example the container hosted applications 59 health status object. This object may track the overall health of the container hosted applications 59, thus allowing for the reporting of health and status of each specific container hosted applications 59 in a generic and extensible format.

The container interface 48 may allow the container hosted applications 59 to query information and data from the digital signage media playback engine 25 that may be relevant to the container hosted applications 59 itself. For example, container hosted applications 59 may query the digital signage media playback engine 25 regarding the status of a file download that it had requested earlier. Other examples of such queries may be specific digital signage media playback engine 25 operating information, such as a currently playing media file, a status of internal sub-systems of the digital signage media playback engine 25, or the status of the host operating system 61 of the digital signage player 31. These values, in turn, may be used by the container hosted application 59 to drive its own business logic.

Figure 16:
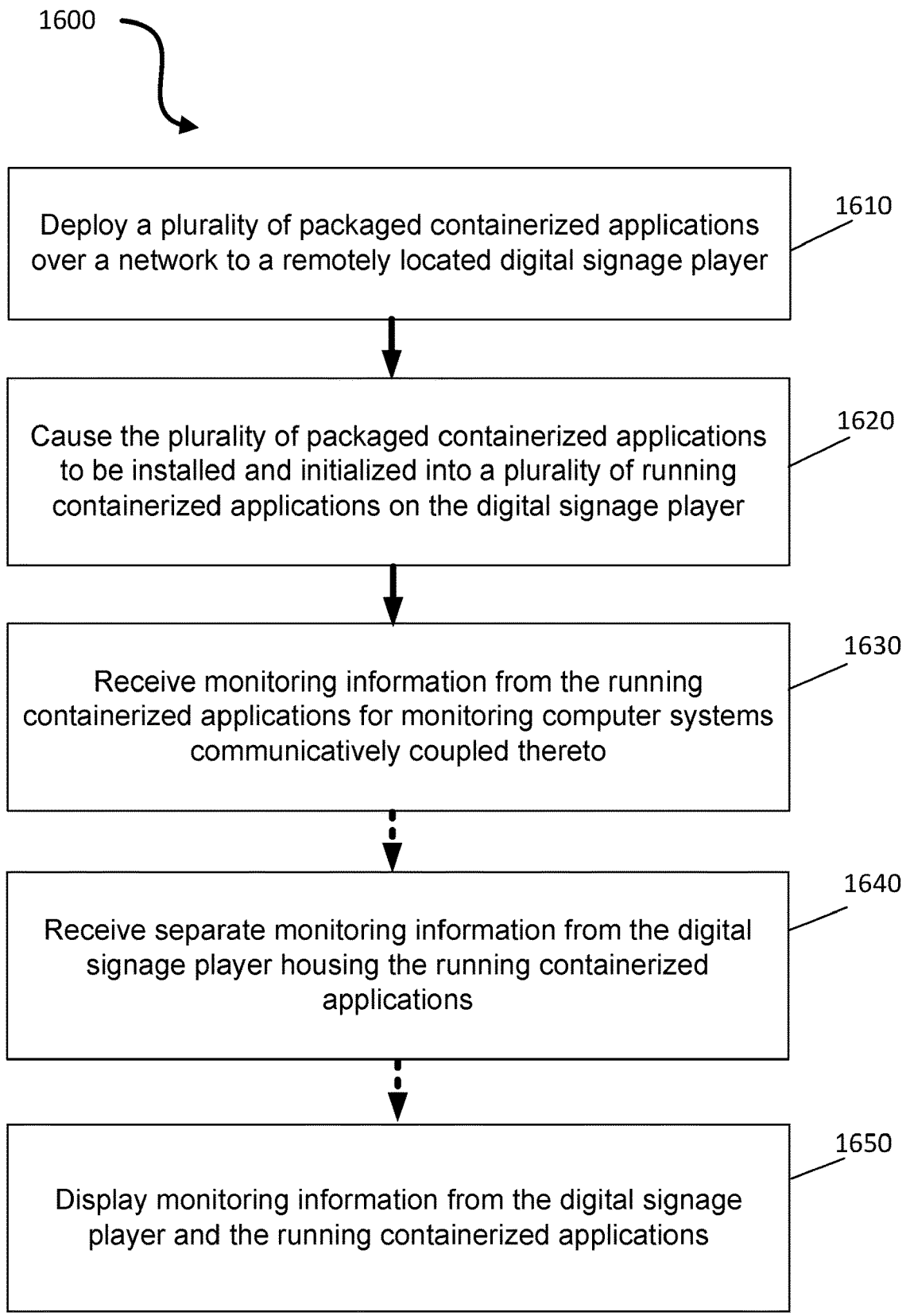
FIG. 16 illustrates a flow diagram of a method of deploying and running containerized applications over a digital signage network, according to the present disclosure.

FIG. 16 illustrates a flow diagram of a method 1600 of deploying and running containerized applications over a digital signage network, according to the present disclosure. Method 1600 may be implemented over the network 100 of the present disclosure and may involve the digital signage CMS 21 deploying a plurality of packaged containerized applications over a network to a remotely located digital signage player 31 (step 1610). The plurality of packaged containerized applications 8 may be caused to be installed and initialized into a plurality of running containerized applications 12 on the digital signage player 31 (step 1620). Monitoring information may be received by the digital signage CMS 21 from the running containerized applications 12 for monitoring computer systems communicatively coupled thereto (step 1630). Optionally, separate monitoring information may be received by the digital signage CMS 21 from the digital signage player 31 housing the running containerized applications (step 1640). Optionally, the monitoring information from the digital signage CMS 21 and the running containerized applications 12 may be displayed at the digital signage CMS 21 via a system health data 38*a* interface (step 1650). Method 1600 may be modified by or include other operations disclosed in connection with the present disclosure.

The methods disclosed may be implemented as sets of instructions or software readable by a device. The specific order or hierarchy of steps in the disclosed methods are examples of sample approaches, and the specific order or hierarchy of steps in the method can be rearranged while remaining within the disclosed subject matter. The accompanying system, method and computer-readable media claims present elements of the various steps in a sample order, and are not necessarily meant to be limited to the specific order or hierarchy presented.

Aspects of the present disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium; optical storage medium; magneto-optical storage medium; read only memory; random access memory; erasable programmable memory; flash memory; and so on.

It is believed that the present disclosure and its advantages will be understood by the foregoing description, and it will be apparent that changes may be made in the form, construction and arrangement of the components without departing from the disclosed subject matter. The form described is merely explanatory, and it is the intention of the following claims to encompass and include such changes.

While the present disclosure has been described with reference to various embodiments, it should be understood that these embodiments are illustrative and that the scope of the disclosure is not limited to them. These and other variations, modifications, additions, and improvements may fall within the scope of the disclosure as defined in the claims that follow.

What is claimed is:

1. A method of deploying and running containerized applications over a digital signage network, comprising:
   deploying from a digital signage content management system executed on the digital signage network, a plurality of packaged containerized applications over the network to a digital signage player remotely located from and communicatively coupled to the digital signage content management system, the digital signage player having a processor and memory; and
   causing the plurality of packaged containerized applications to be installed and initialized into a plurality of running containerized applications on the digital signage player, each running containerized application configured to monitor one or more external computer systems communicatively coupled thereto and to generate monitoring information,
   wherein one of the one or more external computer systems comprises an electronic shelf edge label system, the electronic shelf edge label system comprising at least one electronic shelf edge device, and
   wherein the one of the plurality of running containerized applications transmits instructions to the electronic shelf edge device to generate a human perceptible signal while the digital signage player causes promotional content to be played on an electronic display of the digital signage player in an area proximate the electronic shelf edge device, wherein the played promotional content relates to a product associated with the electronic shelf edge device, and
   wherein the containerized application monitors the electronic shelf edge device and transmits generated monitoring information for use by the digital signage content management system.

2. The method of claim 1, wherein the running containerized application is configured to transmit the generated monitoring information to other running containerized applications.

3. The method of claim 1, wherein the running containerized application is executed from a virtualized environment of the digital signage player, the virtualized environment configured to limit computer resources of the digital signage player that can be used by the running containerized application, the computer resources comprising one or more of CPU resources, memory resources or storage space of the digital signage player.

4. The method of claim 3, wherein a containerized application management and communications interface of the digital signage player is configured to collect status and running statistics information of the virtualized environment and to transmit the collected status and running statistics information to the digital signage CMS.

5. The method of claim 1, wherein a containerized application management and communications interface of the digital signage player is configured to receive the generated monitoring information from the containerized application and transmit the received information to one or more of a digital signage media playback engine or the digital signage content management system.

6. The method of claim 1, wherein the running containerized application is further configured to monitor and generate monitoring information for the digital signage player.

7. The method of claim 1, wherein the running containerized application is configured to transmit video and/or audio output to the electronic shelf edge label system.

8. The method of claim 7, wherein the video and/or audio output is streaming media, and the running containerized application is configured to transmit the streaming media to an electronic display of the electronic shelf edge label system.

9. The method of claim 1, wherein the running containerized application is communicatively coupled to one or more computer systems including a pricing system, inventory system, inventory management system, customer ordering system or wayfinding application, and is configured to monitor the one or more computer systems and transmit generated monitoring information for use by the digital signage content management system.

10. The method of claim 1, wherein the running containerized application is communicatively coupled to an inventory system, and wherein the running containerized application receives product inventory level information from the inventory system and transmits the information for use by a conditional playback engine of the digital signage content management system to determine whether to cease the digital signage player from causing the promotional content to be played on the electronic display, wherein when the promotional content should be ceased from playing, the digital signage content management system transmits instructions to the digital signage player to cease playing the promotional content on the electronic display.

11. The method of claim 1, wherein the human perceptible signal is one or more of a flashing light, a playing sound, a vibration, a playing audio and/or video, or streaming content.

12. The method of claim 1, wherein the running containerized application retrieves dynamic content from the one or more external computer systems and transmits the retrieved content for display on the electronic display of the digital signage player.

13. A network-based digital signage system comprising:
a digital signage player communicatively coupled to an electronic display, the digital signage player configured to transmit media content to the electronic display for playing the media content thereon;
a plurality of electronic shelf edge devices communicatively coupled to the digital signage player via running containerized applications of the digital signage player, the containerized applications monitoring the plurality of electronic shelf edge devices, wherein the running containerized applications transmit monitoring data over a network for use by a digital signage content management server remotely located from the digital signage player.

14. The digital signage system of claim 13, wherein the electronic shelf edge devices comprise a human perceptible signal generator configured to generate one or more of a flashing light, a playing sound, a vibration, a playing audio and/or video, or streaming content.

15. The digital signage system of claim 13, wherein the digital signage player comprises a Docker container, wherein the Docker container is configured to enable the running containerized applications to be implemented on the digital signage player.

16. The digital signage system of claim 15, wherein the containerized application is configured to receive event messages and data from one of the plurality of electronic shelf edge devices, and the Docker container comprises an interface configured to transmit the received messages and data to the remotely located digital signage content management server via a containerized application management and communications interface of the digital signage player.

17. The digital signage system of claim 13, wherein the system comprises a conditional playback engine configured to receive inventory data for a product from a plurality of the running containerized applications, each configured to retrieve the inventory data from an electronic inventory system, wherein if the conditional playback engine determines the inventory data is at or above a pre-determined level, media content associated with the product is caused to be played on a display of the digital signage player, wherein the media content is associated with the product, and wherein if the conditional playback engine determines the inventory data is below the pre-determined level, media content is caused to be played on the display that is unrelated to the product.

18. The digital signage system of claim 13, wherein the running containerized application is configured to transmit instructions to the electronic shelf edge device to generate a human perceptible signal, wherein the human perceptible signal is one or more of a flashing light, a playing sound, a vibration, a playing audio and/or video, or streaming content, and wherein when the running containerized application is configured to determine whether to transmit instructions to the electronic shelf edge device to generate the human perceptible signal based on inventory data retrieved by the running containerized application.

19. A method of deploying and running containerized applications over a digital signage network, comprising:
deploying from a digital signage content management system executed on the digital signage network, a plurality of packaged containerized applications to a digital signage player remotely located from and communicatively coupled to the digital signage content management system, the digital signage player having a processor and memory;
using the digital signage player to install and initialize the plurality of packaged containerized applications into a plurality of running containerized applications on the digital signage player, each running containerized application configured to monitor an external computer system communicatively coupled to the running containerized application and to generate monitoring information,
wherein a first group of the running containerized applications is configured to transmit digital signage content to, and to monitor at least one of the group selected from: an electronic shelf edge label system, a pricing system, an inventory system, or an external computer device,
wherein a second group of the running containerized applications is configured to monitor at least a different one from the group selected from: an electronic shelf edge label system, a pricing system, an inventory system, or an external computer device,
wherein monitoring information generated by the first group of running containerized applications comprises monitoring information that differs from monitoring information generated by the second group of running containerized applications,
wherein the monitoring information is transmitted for use by the digital signage content management system.

20. The method of claim 19, wherein the monitoring information is collected and a centralized view of the monitoring information is transmitted for display on a display device of the digital signage content management system.

* * * * *